(12) United States Patent
Kameshima

(10) Patent No.: US 12,498,496 B2
(45) Date of Patent: Dec. 16, 2025

(54) RADIATION IMAGING SYSTEM AND RADIATION IMAGING METHOD

(71) Applicant: RIKEN, Saitama (JP)

(72) Inventor: Takashi Kameshima, Hyogo (JP)

(73) Assignee: RIKEN, Saitama (JP)

( * ) Notice: Subject to any disclaimer, the term of this patent is extended or adjusted under 35 U.S.C. 154(b) by 126 days.

(21) Appl. No.: 18/539,306

(22) Filed: Dec. 14, 2023

(65) Prior Publication Data

US 2024/0168181 A1    May 23, 2024

Related U.S. Application Data

(63) Continuation of application No. PCT/JP2022/024322, filed on Jun. 17, 2022.

(30) Foreign Application Priority Data

Jun. 18, 2021    (JP) .................................. 2021-101679

(51) Int. Cl.
*G01T 1/20*    (2006.01)
*G01N 23/04*    (2018.01)
(Continued)

(52) U.S. Cl.
CPC ........... *G01T 1/2018* (2013.01); *G01N 23/04* (2013.01); *G01N 23/083* (2013.01); *G01T 1/2023* (2013.01)

(58) Field of Classification Search
CPC ....... G01T 1/2018; G01T 1/2023; G01T 1/20; G01N 23/04; G01N 23/083; G01N 2223/407; H05G 1/36; H05G 1/38
See application file for complete search history.

(56) References Cited

U.S. PATENT DOCUMENTS 5,554,850 A * 9/1996 Hejazi ................. G01T 1/20183
                                                                250/370.11
5,864,146 A    1/1999 Karellas
(Continued)

FOREIGN PATENT DOCUMENTS

CN        109187591 A      1/2019
JP        2014531032 A    11/2014
(Continued)

OTHER PUBLICATIONS

International Search Report and Written Opinion (ISA/237) of the International Search Authority for International Patent Application No. PCT/JP2022/024322, mailed by the Japan Patent Office on Jul. 19, 2022.
(Continued)

*Primary Examiner* — Kiho Kim

(57) ABSTRACT

A control unit of a radiation imaging apparatus includes: an exposure time control unit which controls a subframe exposure time of an image sensor such that focused fluorescence at a depth of field generated by radiation reaching a scintillator and out-of-focus fluorescence deviating from the depth of field are discretely imaged on a light receiving surface of the image sensor for each particle of the radiation; a focused signal discrimination unit which discriminates between sensor signals of a light receiving pixel group corresponding to spots of the focused fluorescence discretely included in each subframe and sensor signals of a light receiving pixel group corresponding to spots of the out-of-focus fluorescence; and an image signal processing unit which generates an image by overlaying subframe data based on the sensor signals from the light receiving pixel group corresponding to the spots of the focused fluorescence.

15 Claims, 14 Drawing Sheets

(51) Int. Cl.
*G01N 23/083* (2018.01)
*G01T 1/202* (2006.01)

(56) References Cited

U.S. PATENT DOCUMENTS

| 2001/0002315 | A1 | 5/2001 | Schultz |
| 2014/0253713 | A1 | 9/2014 | Zhai |
| 2021/0088677 | A1 | 3/2021 | Kameshima |

FOREIGN PATENT DOCUMENTS

| JP | 2019020336 A | 2/2019 |
| JP | 2019215205 A | 12/2019 |

OTHER PUBLICATIONS

Takashi Kameshima et al., "Field of view enhancement of high-resolution X-ray imaging detector", Proceedings of the 68th Japan Society of Applied Physics Spring Academic Conference, vol. 68th, Feb. 26, 2021.
Takashi Kameshima et al., "Development of sub-10 nm resolution X-ray imaging detector equipped with a scintillator solid-immersion optics", Proceedings of the 82nd Autumn Academic Conference of the Japan Society of Applied Physics, vol. 82nd, Aug. 26, 2021.
Extended European Search Report for counterpart European Application No. 22825085.8, issued by the European Patent Office on Apr. 4, 2025.

\* cited by examiner

RADIATION IMAGING SYSTEM AND RADIATION IMAGING METHOD

BACKGROUND

1. Technical Field

The present invention relates to a radiation imaging apparatus, and particularly to a new radiation imaging apparatus and a radiation imaging method for improving spatial resolution by achieving super-resolution.

2. Related Art

A radiation imaging apparatus, particularly an imaging apparatus using X rays, is used as a non-destructive inspection tool for finely-processed products such as a semiconductor device, or as an excellent observation and analysis tool in a wide range of fields from material science and life science to basic physics. An indirect imaging type X-ray imaging apparatus used for such an application generally includes a camera optical system which converts an X-ray image into a visible light image by a scintillator and exposes the visible light image by an image sensor, and a signal processing system which performs image processing based on an imaging signal from the image sensor and obtains an analysis video. On the other hand, in the field of semiconductor integrated circuit devices, miniaturization of a line width has progressed rapidly in recent years, and an X-ray imaging apparatus having high resolution corresponding thereto is required. In response to such a demand, various improvements have been made to increase resolution in each of the camera optical system and the signal processing system. Patent document 1 below discloses one of measures for improving spatial resolution for the camera optical system including the scintillator.

PRIOR ART DOCUMENT

Patent Document

Patent Document 1: Japanese Patent Application Publication No. 2019-20336

Technical Problem

Patent Document 1 proposes that, in a so-called indirect imaging type X-ray imaging apparatus, spatial resolution is improved to about 100 nm close to a theoretical limit value by adopting a lens-integrated scintillator, a so-called solid immersion lens (SIL), in which a fluorescent film as a scintillator which converts incident X rays into visible light is formed on one surface of a lens-shaped substrate formed of a solid optical material having a refractive index close to the refractive index of the fluorescent film while maintaining uniformity of the refractive index. However, such a solid immersion lens has a high technical difficulty in production, and there is still a problem in practical application. That is, for practical application of such a SIL, an extremely thin scintillator film on the submicron scale is required, and an optical quality in the scintillator is likely to deteriorate during thin film processing, so that highly accurate optical design cannot be performed, which makes it difficult to obtain a product with a stable quality. In addition, even when the X-ray imaging apparatus using the SIL as in Patent Document 1 is achieved, a theoretical limit value as an optical system is reached, and thus there is a problem that it is not possible to expect spatial resolution greatly exceeding the theoretical limit value, and it is not possible to meet the demand for observation of imaging targets that are increasingly miniaturized on the order of nanometers.

DESCRIPTION OF EXEMPLARY EMBODIMENTS

Hereinafter, the invention will be described through embodiments of the invention, but the following embodiments do not limit the invention according to claims. In addition, not all of the combinations of features described in the embodiments are essential to the solving means of the invention.

(Schematic Configuration of Imaging Apparatus)

Figure 1:
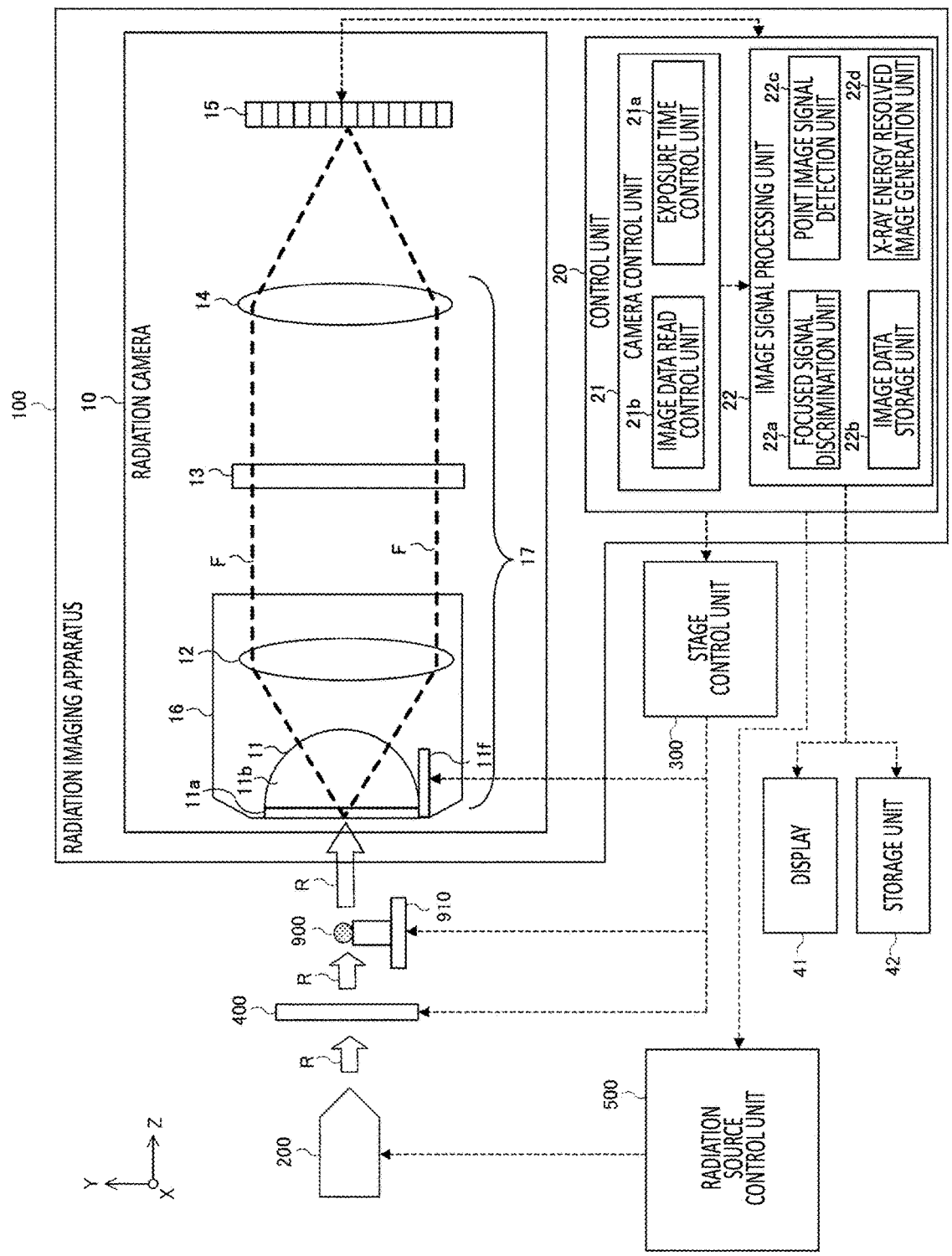
FIG. 1 shows a schematic configuration of a radiation imaging apparatus 100 in the present embodiment.

FIG. 1 shows a schematic configuration of a radiation imaging apparatus 100 in the present embodiment. The radiation imaging apparatus 100 includes a radiation camera 10 and a control unit 20. The radiation imaging apparatus 100 is an apparatus which acquires an image of a sample 900 with predetermined spatial resolution by using radiation from a radiation source 200. The radiation camera 10 includes a solid immersion lens (hereinafter, also referred to as a SIL) 11, an objective rear-stage lens group 12, a band pass filter 13, an imaging lens 14, and an image sensor 15. The solid immersion lens (SIL) 11 and the objective rear-stage lens group 12 form an objective lens 16. The objective lens 16, the band pass filter 13, and the imaging lens 14 form an imaging optical system 17.

The control unit 20 includes a camera control unit 21 and an image signal processing unit 22. The camera control unit 21 includes an exposure time control unit 21a and an image data read control unit 21b. The exposure time control unit 21a has a so-called camera shutter function, and controls the subframe exposure time of the image sensor 15 so that the radiation having reached the SIL 11 to be converted into visible fluorescence is discretely imaged for each fluorescence spot corresponding to one particle of the radiation on the light receiving surface of the image sensor 15. The image data read control unit 21b sends, to an image data storage unit 22b, a subframe data group obtained by reading, for each subframe, sensor signals from a pixel array constituting the light receiving surface of the image sensor 15.

The image signal processing unit 22 includes a focused signal discrimination unit 22a, the image data storage unit 22b, a point image signal detection unit 22c, and an X-ray energy resolved image generation unit 22d. The focused signal discrimination unit 22a compares the sensor signals of the light receiving pixel group corresponding to the focused fluorescence spots discretely included in each subframe and the sensor signals of the light receiving pixel group corresponding to the out-of-focus fluorescence spots with a theoretical focused spot pattern (Airy disk) to discriminate between them. The image data storage unit 22b stores the image data output from the image sensor 15.

The point image signal detection unit 22c and the X-ray energy resolved image generation unit 22d execute an additional function for photon localization processing to be described later. The point image signal detection unit 22c processes point image sensor signals from the light receiving pixel group corresponding to the spots of the focused fluorescence, calculates a center position of a point image in the light receiving pixel group, and generates the subframe group based on the center position. The X-ray energy resolved image generation unit 22d sorts light reception sensor signal levels for each of the spots of the focused fluorescence generated corresponding to the radiation discretely incident on the SIL 11 with different energies in units of particles, into a plurality of level ranges in a plurality of consecutive subframes, and generates the image corresponding to the energy distribution of the radiation, based on the sensor signals of the spots of the focused fluorescence included in the same level range. A display 41 and a storage unit 42 are connected to the image signal processing unit 22, and the captured image generated by the image signal processing unit 22 is displayed on the display 41.

The radiation may be a gamma ray, an X ray, an electron beam or an ultraviolet ray (particularly, an extreme ultraviolet ray, for example). When the radiation is an X ray, the radiation imaging apparatus 100 can be used for X-ray imaging, X-ray CT, X-ray laminography, X-ray topography, an X-ray imaging microscope, and the like. Hereinafter, in the present embodiment, X rays are used as the radiation, and are shown as X rays R in FIG. 1.

As shown in FIG. 1, after the intensity of the X rays R from the radiation source 200 is controlled via a radiation attenuation plate 400, a sample 900 is irradiated with the X rays R, and the X rays R passing through the sample 900 or scattered by the sample 900 is incident on a fluorescent film 11a as a scintillator integrally provided on the front surface of a lens-shaped substrate 11b constituting the first front lens of the objective lens 16. The lens-integrated SIL 11 including the fluorescent film 11a and the lens-shaped substrate 11b having a convex lens-shaped emission surface constitutes an optical element called a so-called solid immersion lens. The fluorescent film 11a converts the incident X rays R into fluorescence F which is visible light that can be received (sensed) by the image sensor 15. An image by the fluorescence F from the SIL 11 is enlarged (reduced in some cases) by the imaging optical system 17 and then projected onto the image sensor 15, whereby the structural information of the sample 900 can be obtained with a predetermined spatial resolution.

Similarly to an optical microscope, the theoretical limit value of the spatial resolution in such a radiation imaging apparatus 100 is expressed by the resolution of Rayleigh of a camera optical system. In the radiation imaging apparatus 100 with the scintillator-integrated solid immersion lens placed at the forefront, spatial resolution $\delta$ is expressed by "$\delta=0.61\times\lambda/NA$". Here, $\lambda$ represents a wavelength of the fluorescence F which is visible light converted by fluorescent film 11a. NA represents the numerical aperture of the camera optical system and is defined by "$NA=n\cdot\sin\theta$". n represents a refractive index of the lens-shaped substrate 11b itself as a medium filling a space between the fluorescent film 11a serving as an imaging target surface and the lens-shaped substrate 11b. $\theta$ is an aperture angle, and represents a maximum angle with respect to the optical axis of visible rays incident on the convex surface of the lens-shaped substrate 11b from the fluorescent film 11a.

For the sake of concrete description, a three-dimensional orthogonal coordinate system including an X axis, a Y axis, and a Z axis orthogonal to each other is assumed. A traveling direction of the X rays R with which the sample 900 is irradiated is parallel to the Z axis, and thus the traveling direction of the X rays R transmitting through the sample 900 is also parallel to the Z axis.

The fluorescent film 11a is provided on the surface of the SIL 11 on the incident side of the X rays R. A portion of the SIL 11 where the fluorescent film 11a is not formed is referred to as the lens-shaped substrate 11b. Therefore, the space between the lens-shaped substrate 11b and the fluorescent film 11a is filled with the lens-shaped substrate 11b material as a medium, and there is no void. The fluorescent film 11a is constituted by a fluorescent material as the scintillator which receives the X rays R transmitting through the imaging target sample 900 and emits the fluorescence F that is visible light.

The fluorescence F emitted from the fluorescent film 11a is typically in a wavelength band in which the image sensor 15 has sensitivity. The fluorescence may be visible light or light in an ultraviolet region. For example, the fluorescence has a wavelength in a range of 200 nm to 700 nm.

The fluorescence F generated in the fluorescent film 11a by the excitation of the incident X-ray photons passes through the objective rear-stage lens group 12 from the lens-shaped substrate 11b with a generation position corresponding to the incident depth of the X rays R as a starting point, so as to become parallel light, and passes through the imaging lens 14 arranged at the rear stage to be imaged on the image sensor 15.

The objective rear-stage lens group 12 is constituted by one or more lenses. The objective rear-stage lens group 12 cooperates with the lens-shaped substrate 11b of the SIL 11 to cause the fluorescence F from the fluorescent film 11a to be parallel light. In the fluorescence F that has become parallel light, only a wavelength in a specific frequency band is allowed to pass by the band pass filter 13, and then is incident on the imaging lens 14. The imaging lens 14 forms an image of the fluorescence F, which has become parallel light, on the imaging surface of the image sensor 15. By performing optical design including the SIL 11 including the fluorescent film 11a, the objective rear-stage lens group 12, and the imaging lens 14, it is possible to reduce various aberrations and improve spatial resolution and image quality. In addition, a configuration may be made such that the band pass filter 13 is not included. In addition, in the description of FIG. 1, an example has been described in which the lens system is constituted by an infinity correction optical system, but the lens system may be constituted by a finite distance correction optical system optically designed as one objective lens 16 including the SIL 11, the objective rear-stage lens group 12, and the imaging lens 14. At this time, the light emitted from the objective rear-stage lens group 12 may not be parallel, and the band pass filter 13 may not be included.

The focusing of the imaging optical system 17 is performed by arranging any one of the SIL 11, the objective rear-stage lens group 12, the imaging lens 14, or the image sensor 15 in a position-adjustable manner, and forming an image based on the fluorescence F on the image sensor 15 through the position adjustment.

A lens support which supports each lens constituting the imaging optical system 17 including the objective lens 16 and the imaging lens 14 at a predetermined position may be included. All the lenses constituting the imaging optical system 17 may be supported by a single lens support, and the lens support may be constituted by a plurality of lens supports.

For example, the image sensor 15 is a charge coupled device (CCD) image sensor, a complementary metal oxide semiconductor (CMOS) image sensor, or the like, and is a so-called two-dimensional image sensor having a light receiving surface in which a plurality of photoelectric conversion pixels are arranged vertically and horizontally. An image signal that is an electric signal is generated by the photoelectric conversion. The image formed on the image sensor 15 is an image corresponding to the light emission position and the light emission intensity of the fluorescence F in the fluorescent film 11a, and the light emission position and the light emission intensity of the fluorescence F in the fluorescent film 11a depend on the incident position and the incident intensity of the X rays R with respect to the fluorescent film 11a.

In the imaging signal indicating the image (optical image) formed on the light receiving surface, the exposure time (sensitive time) of one subframe is controlled to be extremely short as described later by the control signal from the exposure time control unit 21a in the camera control unit 21, and an image data signal of a visible light spot corresponding to one X-ray photon can be output in response to the signal from the image data read control unit 21b. The image signal processing unit 22 performs, on the image data signal of the visible light spot in the subframe output from the image sensor 15, processing of the focused signal discrimination unit 22a discriminating between a focused signal and an out-of-focus signal, and obtains a plurality of subframes of only the focused signal to configure an observation image, thereby making it possible to obtain an extremely clear high-definition image.

The control unit 20 is connected to a stage control unit 300 outside the radiation imaging apparatus 100, and can issue a command to the stage control unit 300. The stage control unit 300 can move, to appropriate positions, a SIL stage 11f on which the SIL 11 is placed and a sample stage 910 on which the sample 900 is placed, based on the command received from the control unit 20. In addition, the stage control unit 300 can insert and remove the radiation attenuation plate 400, based on the command received from the control unit 20. In addition, the control unit 20 is connected to a radiation source control unit 500, and can control the intensity, timing, and irradiation time of the X rays R emitted from the radiation source 200. Note that focus adjustment may be performed with a stage placed on any one of the SIL 11, the objective rear-stage lens group 12, the imaging lens 14, or the image sensor 15, or focus adjustment may be performed with a plurality of stages placed on an arbitrary combination thereof.

A size E of blur due to the diffraction of the X rays R generated in the sample 900 is expressed by $\varepsilon = \sqrt{\lambda} \cdot \sqrt{d}$ using a wavelength $\lambda$ of the X rays R and a distance d between the sample 900 and the fluorescent film 11a, and when the distance d between the sample 900 and the fluorescent film 11a is large, the blur due to the X-ray diffraction becomes large. Therefore, in order to minimize the blur due to the diffraction of the X rays R, the sample 900 is moved and arranged on a sample stage 910 so as to be close to or in close contact with the fluorescent film 11a. Further, by bringing the radiation source center of the radiation source 200 and the sample 900 close to each other, it is possible to increase the intensity per unit area of the X rays R on the fluorescent film 11a.

Although not shown in FIG. 1, an imaging optical system for X rays that diffracts, refracts, or reflects the X rays R may be arranged between the sample 900 and the fluorescent film 11a, and the X-ray image of the sample 900 may be formed on the fluorescent film 11a in an enlarged manner, in a reduced manner, or at an equal magnification, so that the blur due to the X-ray diffraction does not occur. At the same time, an illumination optical system for X rays may be arranged between the radiation source 200 and the sample 900.

(Lens Integrated Scintillator and Solid Immersion Lens)

Figure 2A:
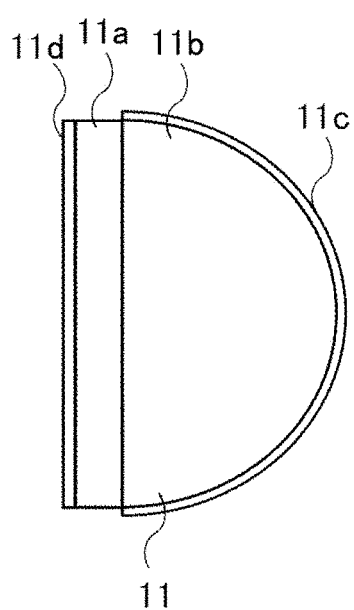
FIG. 2A shows a schematic configuration of a SIL 11 in the present embodiment.
Figure 2B:
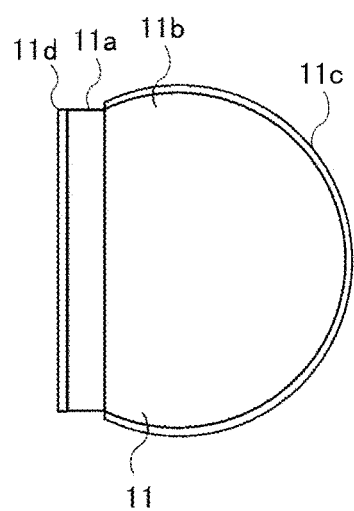
FIG. 2B shows a schematic configuration of the SIL 11 in the present embodiment.
Figure 2C:
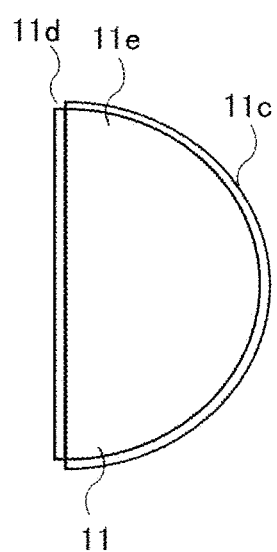
FIG. 2C shows a schematic configuration of the SIL 11 in the present embodiment.
Figure 2D:
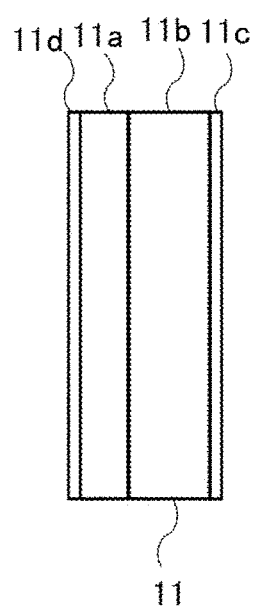
FIG. 2D shows a schematic configuration of the SIL 11 in the present embodiment.

Hereinafter, the lens-integrated scintillator, the so-called solid immersion lens (SIL) 11 used in the present embodiment will be described again. FIGS. 2A to 2C show schematic configurations of the SIL 11 in the present embodiment. The SIL 11 as a premise of the present embodiment is based on the configuration disclosed in Patent Document 1 referred to above, and may have a hemispherical shape as shown in FIG. 2A or a hyper-hemispherical shape as shown in FIG. 2B. FIGS. 2A and 2B show a type in which the SIL 11 includes, as individual members, the fluorescent film 11a as the scintillator and the lens-shaped substrate 11b, and FIG. 2C shows a type in which the entire SIL 11 is integrally formed of a lens-shaped fluorescent substrate 11e which is a solid optical material having the same scintillator function. That is, the SIL 11 in FIG. 2C is entirely formed of the lens-shaped fluorescent substrate 11e which emits fluorescence. In the present embodiment, the description will focus on the SIL 11 in which the fluorescent film 11a is formed on the incident surface side of the lens-shaped substrate 11b and the emission surface side is processed into a convex lens shape to serve as the first front lens of the objective lens 16 as shown in FIG. 2A. Note that as shown in FIG. 2D, the SIL 11 may have a flat plate shape.

The SIL 11 including the fluorescent film 11a and the lens-shaped substrate 11b is formed of a substance transparent to the fluorescence F, the fluorescent film 11a absorbs the energy of the radiation and emits the fluorescence F, and the lens-shaped substrate 11b does not emit fluorescence even when absorbing the energy of the radiation, or does not emit fluorescence having the same wavelength as that of the fluorescence F, or has a smaller intensity than that of the fluorescent film 11a. The kind of the constituent substance of the SIL 11 is arbitrary as long as the SIL has this characteristic. In the present embodiment, in the SIL 11, the fluorescent film 11a is formed of cerium-added gadolinium aluminum gallium garnet (Ce:GAGG), and the lens-shaped substrate 11b is formed of additive-free gadolinium aluminum gallium garnet (GAGG).

The fluorescent film 11a is obtained by adding a predetermined ratio of Ce as an activator to the same substance as the constituent substance of the lens-shaped substrate 11b (that is, the material of the lens-shaped substrate 11b). Therefore, a difference in refractive index between the fluorescent film 11a and the lens-shaped substrate 11b is suppressed to 0.1% or less. The fluorescent film 11a having a function as the scintillator receives the X rays R and emits the fluorescence F in a visible region of 520 nm, for example.

Optical design is performed to include the SIL 11 and the objective rear-stage lens group 12 and as one objective lens 16 having a specimen surface on the surface layer of the fluorescent film 11a of the SIL 11, so that a solid immersion objective lens with high spatial resolution in which various aberrations are suppressed is obtained. For example, when the fluorescent film 11a is composed of Ce:GAGG and the aperture angle of the objective lens 16 is 72 degrees, the numerical aperture $NA = n \cdot \sin \theta = 1.85 \times 0.95 = 1.76$. Therefore, the spatial resolution reaches $\delta = 0.61 \times \lambda / NA = 0.61 \times 520$ nm$/1.76 = 180$ nm.

The material of the SIL 11 including the fluorescent film 11a and the lens-shaped substrate 11b is not limited thereto, and various solid optical materials can be adopted. The material (solid optical material) of the SIL 11 is required to be a transparent solid having no birefringence with respect to the wavelength of the fluorescence F. For example, a single crystal and a polycrystal having an amorphous or cubic crystal structure such as glass are used which are an optically isotropic body. In the case of the polycrystal, it is a condition for achieving transparency that the continuity of the refractive index with respect to the wavelength of the fluorescence F is maintained by removing voids in the crystal and making the size of a crystal grain boundary sufficiently smaller than the wavelength of the fluorescence F. In addition, a crystal having a crystal structure having optical anisotropy may be adopted, but is limited to a polycrystal. In this case, it is a condition for achieving transparency that by removing voids in the crystal and making not only the size of the crystal grain boundary but also the size of a crystal grain sufficiently smaller than the wavelength of the fluorescence F, the continuity of the refractive index with respect to the wavelength of the fluorescence F is maintained while preventing generation of birefringence.

As long as the above is satisfied, in the present embodiment, the material may be an inorganic material, an organic material, or a mixture of two or more thereof.

That is, when the SIL 11 is composed of an inorganic material, specific scintillator materials having a cubic crystal structure which is an optically isotropic body include $Lu_3Al_5O_{12}$ (LuAG), $Y_3Al_5O_{12}$ (YAG), and $Gd_3Ga_5O_{12}$ (GGG) which are garnet type crystals, $Lu_2O_3$, $Y_2O_3$, $Gd_2O_3$, and $Sc_2O_3$ which are sesquioxide type crystals, $CaF_2$ and $BaF_2$ which are fluorite type crystals, and as CsI and NaI which are iodide crystals. In addition, $Cs_2HfCl_6$, $Cs_2HfF_6$, and the like are also cubic scintillator materials. In addition, any one of $LuAlO_3$ (LuAP), $YAlO_3$ (YAP), and $GdAlO_3$ (GAP) which perovskite type crystals, $Lu_2SiO_5$ (LSO), $Y_2SiO_5$ (YSO), $LuYSiO_5$ (LYSO), $Gd_2SiO_5$ (GSO), silicate type crystals, $Lu_2Si_2O_7$ (LPS), $Y_2Si_2O_7$ (YPS), $Gd_2Si_2O_7$ (GPS), $(Gd, La)_2Si_2O_7$ (La-GPS) which are pyrochlore type crystals, $PbWO_4$ which is a tungstic acid crystal, $LiCaAlF_6$ which is a colquiriite type crystal, $Lu_2O_2S$, $Y_2O_2S$, and $Gd_2O_2S$ which are oxysulfide type crystals, or other inorganic crystals $Bi_4Ge_3O_{12}$, $Yb_2SiO_5$, $LaBr_3$, $CeBr_3$, and $SrI_2$ may be used which have crystal structures having optical anisotropy. In addition, a crystal with compositions consisting of two or more elements, such as $(Gd, Lu, Y)_3(Al, Ga)_5O_{12}$ and $(Lu, Y)_2SiO_5$, at each site in the crystal in an arbitrary ratio may be used.

The fluorescent film 11a is obtained by adding an additive as the activator in a predetermined ratio to a base material having the same composition as that of the constituent substance of the lens-shaped substrate 11b (that is, the material of the lens-shaped substrate 11b). In the activator, an element suitable for the base material is selected, and a concentration and an oxidation number are adjusted to those suitable for the base material, so that the fluorescence F having a wavelength which can be sensed by the image sensor 15 is emitted, and a light emission amount and a light emission attenuation time thereof have desired values. In the present embodiment, the fluorescent film 11a is composed of Ce:GAGG obtained by adding Ce to GAGG. The fluorescent film 11a receives the X rays R and emits the fluorescence F of 520 nm, for example.

The thickness of the fluorescent film 11a is thinner than the thickness of the lens-shaped substrate 11b, and is, for example, a thickness in a range of 50 nm to 2 mm. By making the thickness of the fluorescent film 11a smaller than the depth of field of the imaging optical system 17, it is possible to prevent the generation of the fluorescence F which is out of focus on the image sensor 15 which is an imaging plane, and to suppress reduction in spatial resolution of the radiation imaging apparatus 100. In order to realize such high spatial resolution, it is preferable to thin the fluorescent film 11a of the solid immersion lens, but according to the idea of the present embodiment in which the X-ray image is configured only with the signal of the focused fluorescence spot generated by the fluorescent film 11a, it is possible to alleviate the difficulty of forming a high-quality thin fluorescent film.

The fluorescent film 11a is formed while maintaining the continuity of the refractive index with respect to the lens-shaped substrate 11b. Here, the description "formed while maintaining the continuity of the refractive index" means that a difference in the refractive index between the fluorescent film 11a and the lens-shaped substrate 11b is small, the fluorescent film and the lens-shaped substrate are directly bonded without interposing a foreign substance, and the refractive index is substantially uniform. For example, the difference between the refractive index of the lens-shaped substrate 11b and the refractive index of the fluorescent film 11a is less than 0.1% relative to the refractive index of the lens-shaped substrate 11b. Accordingly, it is possible to suppress scattering, refraction, and reflection of fluorescence at the bonding interface. Regarding a bonding method, in order to satisfy the continuity of the refractive index, it is desirable to adopt a method such as solid-phase diffusion bonding and surface activation bonding in which the fluorescent film 11a and the lens-shaped substrate 11b are directly bonded, and there is no void in the bonded surface. Note that as long as the substantially uniform refractive index is satisfied, the fluorescent film 11a may be directly formed on the lens-shaped substrate 11b by a gas phase method such as a physical vapor deposition method (PVD) or a chemical vapor deposition method (CVD). For example, examples of PVD include a thermal vapor deposition method, an ion beam vapor deposition method, a molecular beam epitaxy method, an ion plating method, a sputtering method, a pulse laser deposition method, and the like. Examples of the CVD include thermal CVD, plasma CVD, optical CVD, mist CVD, and the like. In particular, a high-quality single crystal film can be formed by a method of epitaxial growth. Additionally, a liquid phase epitaxial growth method, a solid phase epitaxial growth method, or a sol-gel method may be used. In addition, an adhesive having a small difference in refractive index between the fluorescent film 11a and the lens-shaped substrate 11b may be used.

From the viewpoint of reducing the difference in refractive index, the fluorescent film 11a is most desirably obtained by adding a predetermined ratio of an additive as the activator to a base material having the same composition as that of the constituent substance of the lens-shaped substrate 11b, and next desirably has a crystal structure similar to that of the lens-shaped substrate 11b. For example, in the former, the lens-shaped substrate 11b may be formed of additive-free lutetium aluminum garnet (LuAG), and the fluorescent film 11a may be formed of praseodymium-added lutetium aluminum garnet (Pr:LuAG) or cerium-added lutetium aluminum garnet (Ce:LuAG). In the latter, the fluorescent film 11a may be composed of Ce:GAGG having a garnet crystal structure, and the lens-shaped substrate 11b may be composed of additive-free lutetium aluminum garnet (LuAG) having a garnet crystal structure. In addition, a single crystal may be used as the material of the fluorescent film 11a, and a polycrystal may be used as the material of the lens-shaped substrate 11b, or vice versa.

Although not shown in FIG. 1, as shown in FIG. 2A, in the SIL 11, an antireflection film 11c is arranged on the lens-shaped convex surface portion on the fluorescence emission surface side, and a reflection film 11d is arranged on the flat surface portion on the incident surface side.

As the antireflection film 11c, for example, a multilayer film formed of two or more dielectric films may be used.

The reflection film 11d is constituted by a dielectric multilayer film or a metal reflection film similarly to the antireflection film 11c. A chromium coat or the like may be further arranged on the dielectric multilayer film to improve a light shielding property. The reflection film 11d has a role of reflecting the fluorescence F emitted in the opposite direction to the image sensor 15 and directing the fluorescence F toward the image sensor 15 side to effectively improve the transmission efficiency of the fluorescence F by nearly two times.

As described above, by using the SIL 11 in which the fluorescent film 11a as the scintillator and the lens-shaped substrate 11b as the first front lens of the objective rear-stage lens group 12 are integrally formed so that the refractive index becomes substantially uniform, the imaging optical system 17 having the specimen surface on the fluorescent film 11a and having a high numerical aperture exceeding NA=1.0 can be obtained, and the spatial resolution of the radiation camera 10 can be improved. On the other hand, when the numerical aperture is set to be high, the depth of field becomes small, and thus a relatively thin fluorescent film 11a is required.

A depth of field d, including the foreground and background, is expressed as $d_{tot}=\lambda \cdot n/NA^2$. $\lambda$ is a wavelength of the fluorescence F, n is a refractive index of the fluorescent film 11a with respect to the wavelength $\lambda$, and NA is a numerical aperture of the objective lens 16. For example, in the case of a configuration in which the refractive index of Ce:GAGG with respect to the fluorescence wavelength of 520 nm is 1.85 and the numerical aperture of the objective lens 16 is 1.76, the depth of field is 311 nm. It is technically difficult to process the fluorescent film 11a to be thinner than one micron while suppressing optical deterioration such as distortion.

(Focused Fluorescence and Out-of-Focus Fluorescence)

That is, when the spatial resolution is improved by using the imaging optical system 17 having the large numerical aperture NA, in a case where the fluorescent film 11a having a thickness on the order of the depth of field cannot be formed, the fluorescent film 11a is necessarily thicker than the depth of field of the imaging optical system 17. In this case, a part of the X rays R is absorbed within the depth of field, a part of the X rays R penetrates to a position beyond the depth of field and is absorbed, and the fluorescence F is generated starting from each of the positions where the X rays R are absorbed. That is, in the fluorescence F imaged on the image sensor 15, the fluorescence F (hereinafter, also referred to as focused fluorescence F1) generated within the depth of field which is a focused position and the fluorescence F (hereinafter, also referred to as out-of-focus fluorescence F2) generated outside the depth of field which is an out-of-focus position are mixed.

Figure 3A:
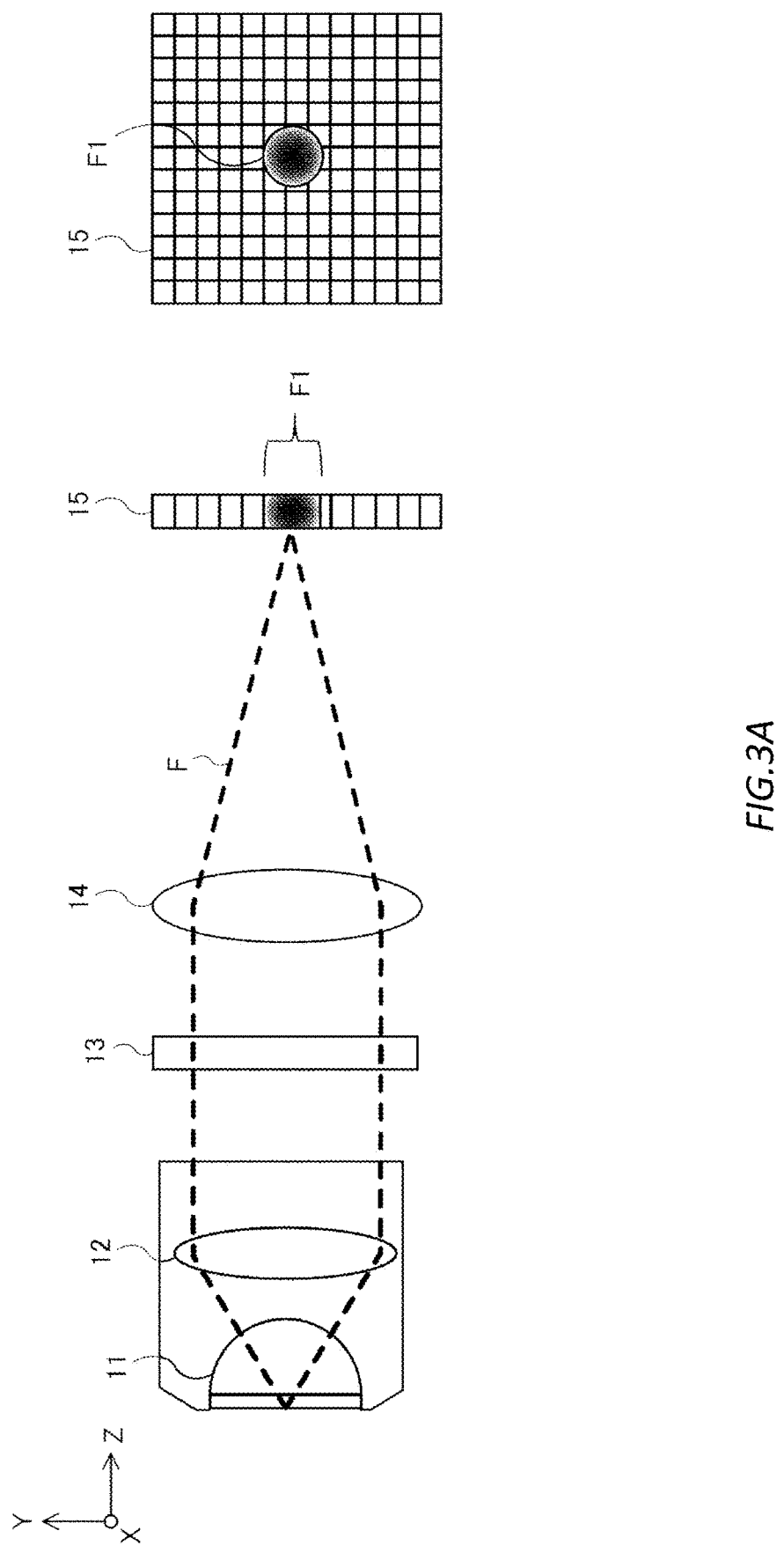
FIG. 3A is a diagram for explaining focused fluorescence F1 and out-of-focus fluorescence F2 in the present embodiment.
Figure 3B:
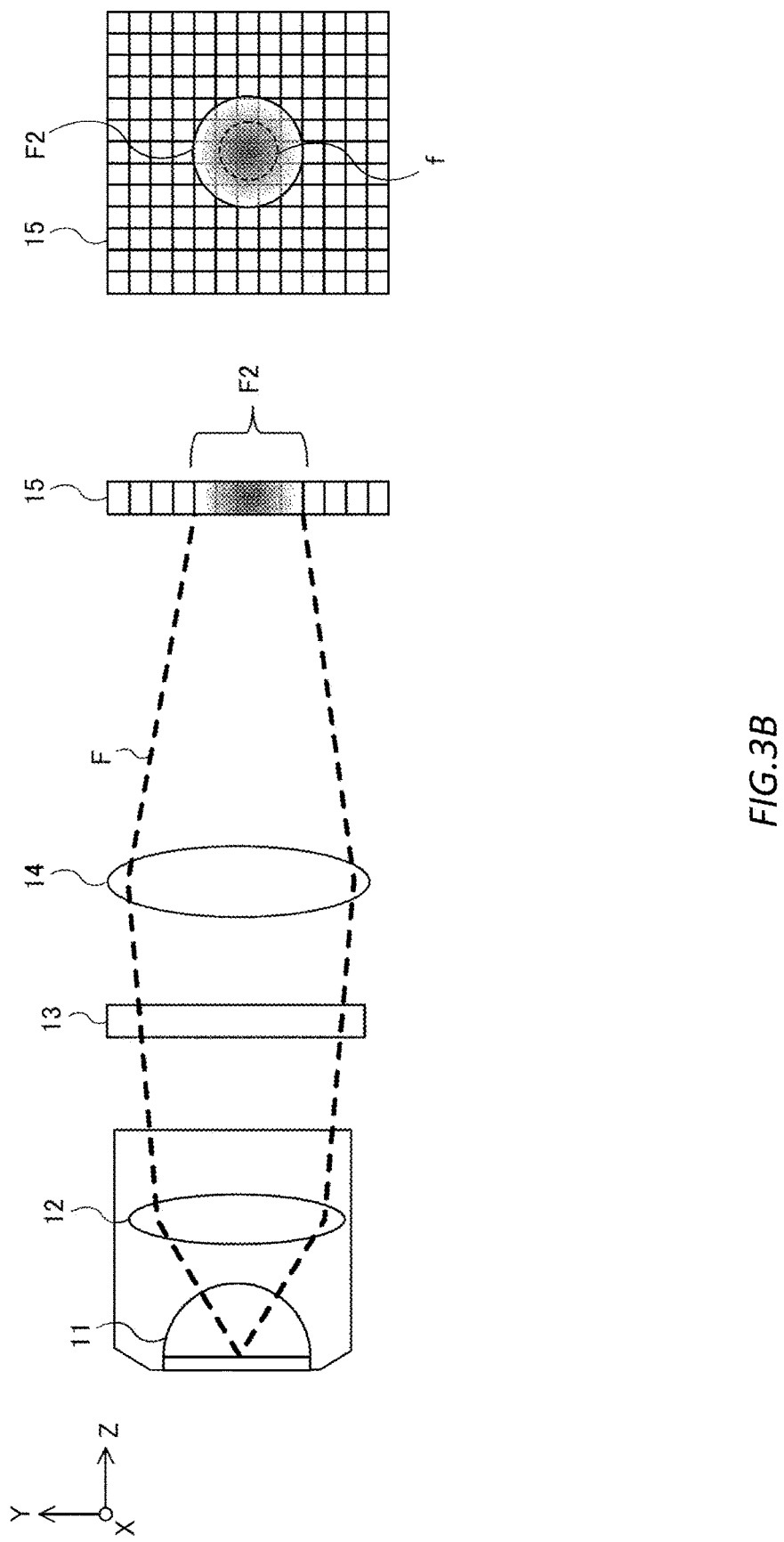
FIG. 3B is a diagram for explaining the focused fluorescence F1 and the out-of-focus fluorescence F2 in the present embodiment.

FIGS. 3A and 3B are diagrams for explaining the focused fluorescence F1 and the out-of-focus fluorescence F2 in the present embodiment. FIG. 3A shows the focused fluorescence F1, which is in focus on the image sensor 15, of visible light emitted from the vicinity of the left side of the fluorescent film 11a determined as the focal position of the objective rear-stage lens group 12, and FIG. 3B shows the out-of-focus fluorescence F2, which is out-of-focus and blurred on the image sensor 15, of visible light emitted from the vicinity of the right side of the fluorescent film 11a deviating from the focal depth of the objective lens 16.

As shown in the right diagram of FIG. 3A, when the fluorescence F forms an image as a focused spot on the image sensor 15, the fluorescence F becomes the focused fluorescence F1 having an irradiation distribution of an Airy disk or a spot shape close thereto. A diameter D is "D=1.22× $\lambda$M/NA" obtained by multiplying two times the Rayleigh spatial resolution $\delta$ by an optical magnification M of the imaging optical system 17. On the other hand, as shown in the right diagram of FIG. 3B, when the fluorescence F is not imaged as a focused spot on the image sensor 15, the fluorescence F becomes the out-of-focus fluorescence F2 having an irradiation distribution of a spot shape larger than that of the Airy disk indicated by a dotted circle f. In an image including an electric signal obtained by photoelectrically converting the out-of-focus fluorescence F2, contrast quality is lowered, and spatial resolution is reduced.

That is, even when an optical system is constructed in which the numerical aperture NA is increased to the utmost by using the solid immersion lens SIL, in a case where the thickness of the fluorescent film 11a cannot be reduced to about the depth of field, the out-of-focus fluorescence F2 is mixed as a component configuring an image, and spatial resolution is reduced. As a result, even in the optical system in which the numerical aperture NA is increased to the utmost of manufacturing accuracy, it is extremely difficult to obtain diffraction-limited spatial resolution. In order to solve this problem, the present embodiment provides a method for removing the signal of the out-of-focus fluorescence F2 and extracting only the signal of the focused fluorescence F1 in a configuration in which the fluorescent film 11a is thicker than the depth of field of the imaging optical system 17, and the fluorescence F imaged on the image sensor 15 includes the focused fluorescence F1 and the out-of-focus fluorescence F2. By applying the present method, it is possible to avoid the reduction of spatial resolution.

(Total X-Ray/Signal Conversion Efficiency as Premise of Focused Fluorescence Discrimination)

The present method uses a detection process in which, in the radiation camera 10 using the scintillator, after X-ray photons are absorbed in the scintillator and converted into visible light, a point image having a predetermined size is formed by a diffraction phenomenon occurring in a transmission process of a lens system as shown in FIGS. 3A and 3B on the right. The point image is observed in units of X-ray photons, and only a signal corresponding to the focused fluorescence F1 is extracted to reconstruct the image.

In order to accurately observe a point image in units of X-ray photons, two components are required: the radiation camera 10 with high sensitivity which can detect one X-ray photon (X-ray photon counting); and a control unit 20 which divides a signal of an X-ray photon group constituting a specimen image into units of X-ray photons.

The sensitivity of a measurement system as a camera is a product of a light emission efficiency $\eta_{LY}(E)=\eta_{SE} \times E$ determined from a conversion efficiency $\eta_{SE}$ unique to the scintillator material and the photon energy E of the X rays of the light source, a light collection efficiency $\eta_{CE}(NA)$ of the optical system depending on the numerical aperture NA, a transmittance $\eta_{TO}$ of the optical system, and a quantum efficiency $\eta_{VQE}$ with respect to the fluorescence F of the image sensor 15, and is expressed by total X-ray/signal conversion efficiency $\eta_{TOTAL}(E, NA)=\eta_{LY}(E) \times \eta_{CE}(NA) \times \eta_{TO} \times N_{VQE}$. That is, when one X-ray photon of the photon energy E is absorbed by the scintillator, $\eta_{LY}(E)$ pieces of fluorescence F in a visible region are emitted in a random direction, and the fluorescence F is incident on the imaging optical system 17 at a ratio of $\eta_{CE}(NA)$ to pass therethrough at the transmittance $\eta_{TO}$ and the quantum efficiency $\eta_{VQE}$ and is detected as $\eta_{TOTAL}(E, NA)$ pieces of electrons on average on the image sensor 15.

The light collection efficiency of the optical system depending on the numerical aperture NA is expressed as $[\eta_{CE}=0.5 \times (1+r) \times (1-\sqrt{1-(NA/\eta_s)^2})]$. r is the reflectance of the reflection film 11d on the X-ray incident surface of the scintillator, NA is the numerical aperture of the objective lens 16, and $n_s$ is the refractive index of the scintillator.

For example, in a conventional form as disclosed in Japanese Patent Application Publication No. 2016-45183, when X rays of 10 keV are detected by using a flat plate-shaped Ce:LuAG scintillator having a refractive index $\eta_s=1.85$ with respect to a fluorescence wavelength and a light emission efficiency [160 visible photons/X-ray photon] with respect to the X rays of 10 keV, an imaging optical system having a dry system objective lens in which a reflection film having a reflectance r=0.95 is coated on an X-ray incident surface of the scintillator to have the numerical aperture NA of 0.95 and a transmittance of 0.9 with respect to the wavelength of the fluorescence F, and a radiation camera constituted by an image sensor having a quantum efficiency of 0.9 with respect to the wavelength of the fluorescence F, parameters are [$\eta_{LY}(10$ keV$)=160$, $\eta_{CE}$ (0.95 NA)=0.14, $\eta_{TO}=0.9$, $\eta_{VQE}=0.9$], and the total X-ray/signal conversion efficiency of the entire radiation camera is [$\eta_{TOTAL}(10$ keV, 0.95 NA$)=\sim 18$ electrons/X-ray photon]. That is, the fluorescence F generated when one photon of the X rays is absorbed in the fluorescent film of the conventional radiation camera is detected as 18 electrons on average on the image sensor.

In order to observe the irradiation distribution of the fluorescence F, it is necessary to measure signals in a plurality of pixels smaller than the irradiation distribution of the fluorescence F. In the X-ray camera having the dry system objective lens configuration as described above, for example, when one X-ray photon is incident on the radiation camera and a total of 18 electrons are distributed in nine pixels on the image sensor 15, the signals are divided into nine signals and detected according to the irradiation distribution. That is, since there are many pixels having a signal equivalent to or lower than the noise value (1 to 2 electrons) held by the image sensor for each pixel, not only the number of statistics is extremely insufficient for observing the irradiation distribution, but also it is difficult to distinguish (X-ray photon counting) between the signal of one X-ray photon and the noise signal. That is, the fluorescence F generated by the one X-ray photon cannot be classified into the focused fluorescence F1 and the out-of-focus fluorescence F2.

On the other hand, in the embodiment of the present embodiment shown in FIG. 1, the imaging optical system 17 in which the numerical aperture is increased to NA=1.85× 0.95=1.76 is configured by adopting the SIL 11 in which the fluorescent film 11a having a Ce:GAGG configuration and having the refractive index $\eta_s=1.85$ with respect to the fluorescence wavelength and the light emission efficiency [600 visible photons/X-ray photon] with respect to the X rays R of 10 keV is used as the scintillator and integrally formed on the incident surface side of the lens-shaped substrate 11b in which the emission surface side has a hemispherical or hyper-hemispherical convex lens shape. At this time, various parameters are [$\eta_{LY}(10$ keV$)=600$, $\eta_{CE}$ (1.76 NA)=0.69, $\eta_{TO}=0.9$, $\eta_{VQE}=0.9$], and the total X-ray/signal conversion efficiency of the radiation camera 10 is [$\eta_{TOTAL}(10$ keV, 1.76 NA$)=335$ electrons/X-ray photon]. That is, the fluorescence F generated when one photon of the X rays is absorbed in the fluorescent film 11a of the radiation camera 10 is detected as 335 electrons on average on the image sensor 15.

(Discrimination of Focused Fluorescence Point Image and Out-of-Focus Fluorescence Point Image)

Thus, the radiation camera 10 of the present embodiment using the scintillator-integrated SIL 11 described above has a light collection efficiency $\eta_{CE}$ up to five times higher than conventional and a light emission efficiency $\eta_{LY}$ up to four times higher than conventional, and as a result, the total X-ray/signal conversion efficiency $\eta_{TOTAL}$ is improved to [335 electrons/X-ray photon] which is nearly 20 times that of the conventional configuration. Even when 335 electrons are divided into 9 pixels and detected, the signal value per pixel far exceeds the noise value (1 to 2 electrons) of the image sensor 15 for each pixel, and the signal value is increased, so that the influence of the light shot noise of the fluorescence F is greatly improved, and thus, the irradiation distribution of the fluorescence F for each X-ray photon can be observed with a sufficient statistical quantity. Therefore, when the fluorescence F generated for each X-ray photon is imaged on the image sensor 15 with an irradiation distribution of the Airy disk for a spot shape of a spot shape close thereto, the fluorescence F can be discriminated as the focused fluorescence F1, and when the fluorescence F is imaged with an irradiation distribution of a spot shape larger than the Airy disk f, the fluorescence F can be discriminated as the out-of-focus fluorescence F2. Here, the Airy disk f indicates the minimum imaging spot at the focused position theoretically determined by the diffraction phenomenon of light, and the irradiation distribution thereof is determined depending on the wavelength λ of the fluorescence F, the numerical aperture NA of the objective lens 16, and the optical magnification M of the imaging optical system 17. Therefore, the Airy disk f is appropriate as a reference of an allowable irradiation distribution for discriminating a focused point image. Note that the point image to be formed is the Airy disk f under ideal conditions, that is, when the point image is formed based on the fluorescence, which is generated at the position starting from the center of the depth of field, in an aberration-free complete optical system, but since the optical system actually has a predetermined aberration, the point image of the focused fluorescence F1 detected within the depth of field is somewhat larger than the Airy disk f. Therefore, the classification is made into the focused fluorescence F1 and the out-of-focus fluorescence F2 by using a value obtained by multiplying a reference value by an allowable factor. For example, when the allowable factor is set to 1.5, if the measured point image has a diameter of 1.5 times or more that of the Airy disk f, the point image is classified into the focused fluorescence F1, and if the measured point image has a diameter of 1.5 times or less that of the Airy disk f, the point image is classified into the out-of-focus fluorescence F2. The allowable factor may be arbitrarily adjusted according to a target spatial resolution, a target detection efficiency, and the magnitude of the aberration of the optical system. In addition, here, the discrimination reference is the diameter size of the Airy disk f, but the reference target is not limited. Other features such as the aspect ratio of the diameter and the approximation to the shape of the Airy disk f may be adopted, or a plurality of features may be used as the reference at the same time.

When the objective lens 16 of the X-ray camera has a scintillator-integrated solid immersion structure, the light collection efficiency $\eta_{CE}$ is only improved by up to five times, so that the total X-ray/signal conversion efficiency [$\eta_{TOTAL}$ becomes 89 electrons/X-ray photon], and further, in the dry objective lens configuration in which the material of the fluorescent film 11a as the scintillator is a Ce:GAGG crystal, the light emission efficiency nu is only improved by up to four times, so that the total X-ray/signal conversion efficiency [$\eta_{TOTAL}$ becomes 68 electrons/X-ray photon], whereby the discrimination accuracy between the focused fluorescence F1 and the out-of-focus fluorescence F2 is reduced. Therefore, in order to execute the idea of discriminating only the focused point image from the out-of-focus image to configure the observation image, the design of the leading optical system of the camera, including the selection of the optical material, is desired so as to generate at least 100 or more electrons on the image sensor 15 per X-ray photon. In this regard, as described below, a configuration is most preferably made such that a solid immersion objective lens in which the Ce-added GAGG fluorescent film 11a is formed integrally with the lens-shaped substrate 11b including GAGG is arranged at the forefront of the X-ray camera.

However, in the discrimination method of the focused fluorescence according to the present embodiment, when the number of electrons detected by photoelectrically converting the fluorescence incident on the light receiving surface of the image sensor 15 for each X-ray photon is 50 or more, a discrimination ability for the focused fluorescence F1 and the out-of-focus fluorescence F2 can be obtained by using the image sensor 15 having low noise such as lower than one electron, so that the resolution improvement effect can be obtained. The number of photoelectrically converted electrons corresponds to the level of the electric signal obtained from each pixel.

That is, the above is an example in which X rays having photon energy of 10 keV are used as the light source, but when X rays having higher photon energy E are used, $\eta_{LY}(E)$ increases in proportion to the photon energy E, so that requirements for $\eta_{CE}(NA)$, no, and $\eta_{VQE}$ are relaxed. That is, when the photon energy is high, the configuration may be made such that the substrate on the flat plate and the dry system objective lens optical system shown in FIG. 2D are adopted instead of the scintillator-integrated solid immersion objective lens optical system, and the NA is relaxed. Alternatively, a scintillator having low conversion efficiency $\eta_{SE}$ may be used for the fluorescent film 11a. On the contrary, when the photon energy E is low, $\eta_{LY}(E)$ becomes small, and thus, there is an increasing demand for $\eta_{CE}(NA)$, $\eta_{TO}$, $\eta_{VQE}$, and conversion efficiency $\eta_{SE}$ of the scintillator, and the imaging optical system 17 having a higher NA and the scintillator having a higher conversion efficiency are required. Even when any photon energy E is used, it is an index for efficiently obtaining the effect of the present method to satisfy the total X-ray/signal conversion efficiency [$\eta_{TOTAL}=\eta_{LY}(E)\times\eta_{CE}(NA)\times\eta_{TO}\times\eta_{VQE}>50$]. That is, it is important to maintain a total conversion efficiency to be 50 or more until visible fluorescence generated by one X-ray photon reaching the scintillator is received by the image sensor 15 and converted into electrons. In order to perform classification into the focused fluorescence F1 and the out-of-focus fluorescence F2 with higher accuracy, it is desirable to satisfy $\eta_{TOTAL}(E, NA)>300$.

As described above, when the solid immersion objective lens optical system using the SIL 11 or the scintillator having high conversion efficiency, for example, the Ce:GAGG scintillator is utilized to sufficiently improve the total X-ray/ signal conversion efficiency $\eta_{TOTAL}$, it is possible to discriminate between the focused fluorescence F1 and the out-of-focus fluorescence F2 in units of X-ray photons, or to increase the accuracy thereof. Accordingly, even when the fluorescent film 11a is thicker than the depth of field of the imaging optical system 17 by reconstructing the specimen image only with the signal of the focused fluorescence F1, it is possible to avoid the reduction of spatial resolution. In addition, as shown in FIG. 2C, even when the lens-shaped fluorescent substrate 11e in which the entire SIL 11 has a scintillator function is used, similarly, it is possible to separate only the focused fluorescence F1 to configure an image, and thus, it is possible to avoid the reduction in spatial resolution.

By configuring the image by using only the signal of the focused fluorescence F1, it is not necessary to strictly control the thickness of the fluorescent film 11a in the case of forming the fluorescent film 11a as shown in FIGS. 2A and 2B, and thus, it is possible to suppress the deterioration of optical quality such as distortion generated during thin film processing. Accordingly, the imaging optical system 17 including the SIL 11 can be optically designed with high accuracy, and as a result, the spatial resolution can be improved. In the case of using the lens-shaped fluorescent substrate 11e in which the entire SIL 11 is composed of a fluorescent material as shown in FIG. 2C, there is no step of forming and processing a thin film, so that the deterioration of optical quality can be further suppressed. At the same time, the processing process is reduced so that the manufacturing cost is also reduced.

In addition, in the present method, the signals of the focused fluorescence F1 are integrated in units of X-ray photons, that is, a photon counting method (photon counting) is applied, and thus signals other than those derived from the X-ray photons, that is, flares, ghosts, or the like generated by noise of the image sensor 15 and scattered light inside the lens that does not contribute to image formation are eliminated during the counting process, so that an image with higher contrast can be obtained.

A focused signal discrimination unit 22a of the image signal processing unit 22, which is an image processing system which divides, for each photon, a signal of X-ray photons configuring a specimen image, performs discrimination processing in which only an electric signal (hereinafter, also referred to as a focused signal) obtained by photoelectrically converting the focused fluorescence F1 is used to generate an image while an electric signal (hereinafter, also referred to as an out-of-focus signal) obtained by photoelectrically converting the out-of-focus fluorescence F2 is not used for image generation. Details of the processing of dividing the signal of the X-ray photon group in units of X-ray photons in order to discriminate the focused fluorescence F1 and the out-of-focus fluorescence F2, and details of the processing of generating an image by using only the focused signal will be described in detail in the subsequent paragraphs and the flowchart of FIG. 7.

As described above, by generating an image by using only the focused signal, the contrast quality of the generated image is improved, and when an X-ray camera is used in which the fluorescent film 11a has a scintillator thicker than the depth of field, it is possible to reach the diffraction-limited spatial resolution. In addition, in the present embodiment, imaging using a photon localization method, which is one of super-resolution techniques, is performed in addition to generating an image by using only the focused signal, whereby resolution exceeding a diffraction limit, which is theoretical spatial resolution, can be obtained. Hereinafter, imaging using the photon localization method will be described.

(Photon Localization Method)

Figure 4:
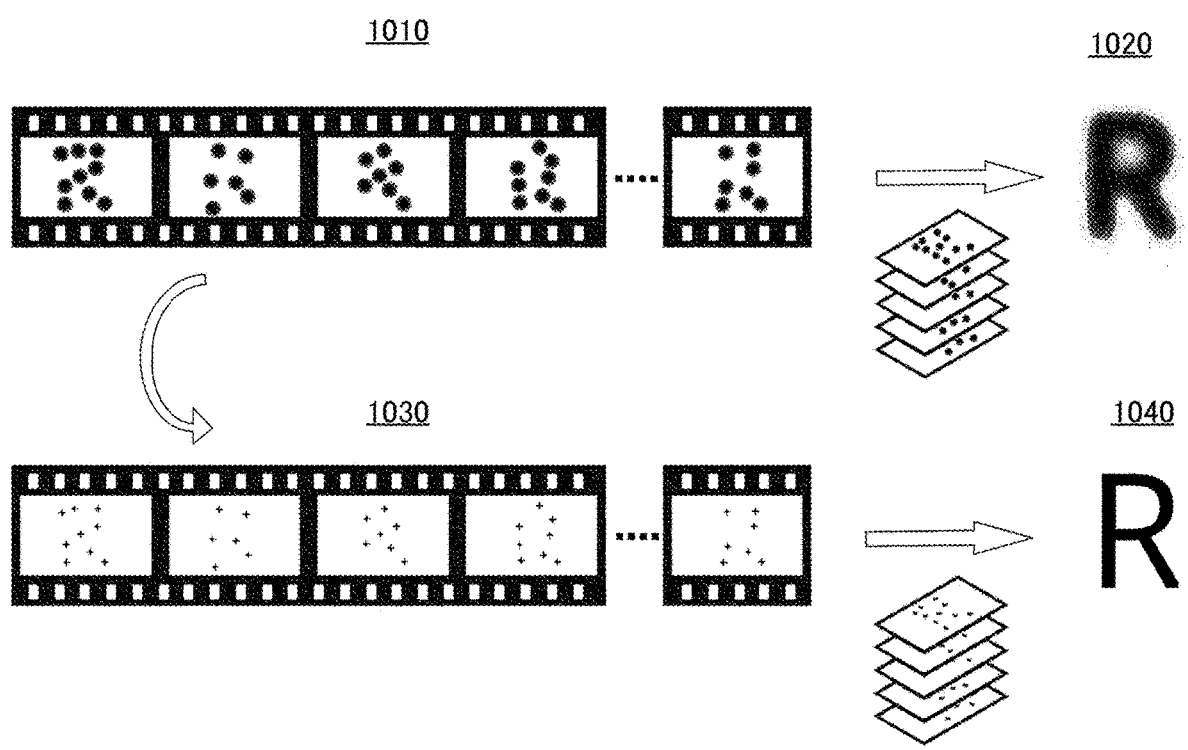
FIG. 4 is a diagram for explaining imaging using a photon localization method.

1010 to 1040 of FIG. 4 are diagrams for explaining an ultra-high definition imaging method using the photon localization method as a function of the point image signal detection unit 22c in the system configuration of FIG. 1. In the X-ray camera using the scintillator, when an X-ray photon group configuring a specimen image is observed in units of X-ray photons, in a case where the X-ray photon group is absorbed at a focused position by the scintillator, the X-ray photon group is converted into visible light by the scintillator, then becomes a bright point (point image) blurred in the shape of the Airy disk f due to a diffraction phenomenon occurring in a transmission process of a lens system, and is measured by the image sensor 15. That is, the image received by the image sensor 15 is configured by setting the point image as a minimum unit of the signal generated by one X-ray photon and integrating the point image according to the incident position of the X-ray photon and the number of X-ray photons. As described in paragraph 0017, the spatial resolution $\delta$ is defined as the radius of the point image of the Airy disk f [$\delta=0.61\times\lambda/NA$].

The photon localization method is a method of specifying the incident position of the X-ray photon with high accuracy by detecting the point image center position of the measured X-ray photon, and the accuracy of localization depends on the number of photons N of the fluorescence F configuring the point image, and is expressed as [$\delta_{SUPER}=\delta/\sqrt{N}$] by using the radius $\delta$ of the point image of the Airy disk f. That is, as the number of photons N of the fluorescence F detected on the image sensor 15 increases, the accuracy of localization is improved. This expression is an approximate value when the noise value of the image sensor 15 is extremely small and the influence of the size of the pixel is ignored.

When the localization processing is applied, the radius size of the point image, which is the minimum unit of signals, is substantially reduced from the radius $\delta$ of the point image of the Airy disk f to a detection error $\delta_{SUPER}$ of the center position. After the size of the point image is reduced, the signals of the detected X-ray photon group are integrated again to configure an image, and the spatial resolution becomes $\delta_{SUPER}$, which is improvement of [$1/\sqrt{N}$] times compared with the original image before processing.

In order to implement the present method, it is necessary to apply the point image measurement and localization processing independently of each X-ray photon. In a normal imaging process in which the signals of a flying X-ray photon group are collectively exposed in one frame, a point image group is integrated to be an image, and thus a point image cannot be measured and evaluated for each X-ray photon. Therefore, the density of the signal of the X-ray photon group per subframe is lowered by dividing the frame into a large number of subframes (frame-by-frame images) with short exposure time and continuously perform imaging. When the density can be lowered to such an extent that X-ray photons can be discretely observed within a subframe as shown in 1010 of FIG. 4, the irradiation distribution of the fluorescence F can be measured for each point image, and localization can be applied as shown in 1030 of FIG. 4. In a case where the X-ray photon signal cannot be sufficiently discretized within the subframe even when the exposure time of the image sensor 15 is set to the minimum, the case may be handled by reducing the X rays output from the radiation source 200 or inserting the radiation attenuation plate 400 between the radiation source 200 and the sample 900 to attenuate the X-ray intensity, so that the density of the X-ray photon group reaching the sample 900 is further reduced.

Figure 5A:
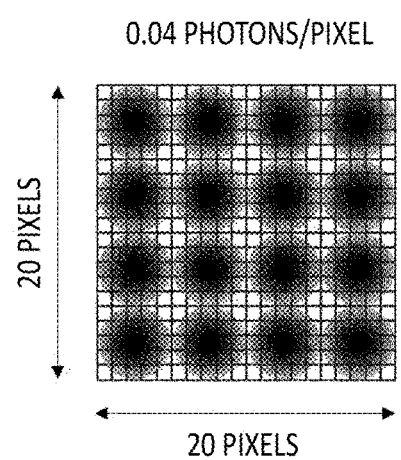
FIG. 5A is a diagram for explaining a density of a signal of a fluorescence spot.

The density of the signals of the fluorescence spot corresponding to the X-ray photon group detected in the subframe serving as an index will be described with reference to FIGS. 5A to 5C. In the drawing, for simplification, the focused fluorescence (focused signal) F1 is arranged at equal intervals, but the focused fluorescence F1 actually includes the out-of-focus fluorescence (out-of-focus signal) F2 having a size larger than that of the focused fluorescence F1, and each detection position is random. An effective pixel size A on a detection surface is ½ to ⅓ of the radius (Airy disk f radius) of the focused fluorescence F1. FIG. 5A shows an example of the detection density $I_{DET}$ (=16 photons/400 pixels=0.04 photons/pixel) at which 16 X-ray photons on average are detected every 400 pixels, FIG. 5B shows an example of the detection density $I_{DET}$ (=9 photons/400 pixels=0.023 photons/pixel) at which 9 X-ray photons on average are detected every 400 pixels, and FIG. 5C shows an example of the detection density $I_{DET}$ (=4 photons/400 pixels=0.01 photons/pixel) at which 4 X-ray photons on average are detected every 400 pixels.

Figure 5B:
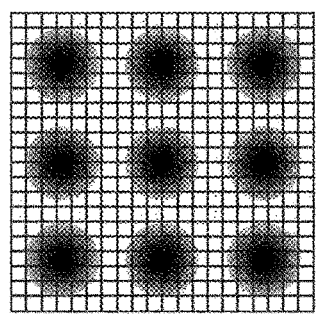
FIG. 5B is a diagram for explaining a density of a signal of a fluorescence spot.
Figure 5C:
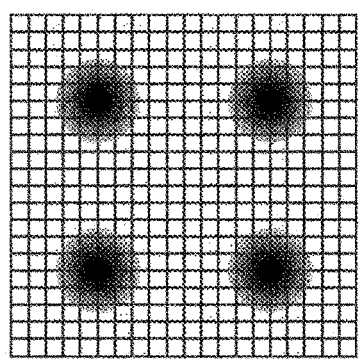
FIG. 5C is a diagram for explaining a density of a signal of a fluorescence spot.

Since the light receiving pixel density of the point image is high under the conditions of FIGS. 5A and 5B, in the actual measurement detected at the random position, the frequency at which the point images spatially overlap with each other is high, and it is difficult to individually evaluate the point images. On the other hand, in FIG. 5C, the frequency at which the point images are detected separately is high, and each point image can be evaluated individually. Therefore, the index of the detection density at which X-ray photons can be discretely observed in a subframe is 0.01 photons/pixel, and a value close to or smaller than this is recommended. However, even at about 0.02 photons/pixel, the overlapped point image signals can be detected from the spread of the light receiving pixels, and thus it is possible to apply the localization processing by performing processing such as excluding the point image from data.

The minimum exposure time of the image sensor 15 is limited by the attenuation time t from emission to quench of the fluorescence F of the scintillator, in addition to the characteristics of the sensor device itself and the limit value on the signal circuit. For example, when the subframe exposure time is not sufficiently longer than this value, the signal of one X-ray photon reaches the image sensor 15 at a boundary time between subframes, and the frequency at which the signal is split into two consecutive subframes increases. In order to sufficiently reduce the splitting frequency, it is desirable to set the exposure time to about 10 times the attenuation time t. Although the splitting frequency of the signal cannot be made completely zero, when the magnitude of the number of photons N of the detected fluorescence F is smaller than a predetermined value, and point image signals are present at the same position of two consecutive subframes, the quality of the data can be maintained by performing processing such as removing these signals or adding up these signals to recover as one X-ray photon signal.

For example, when Ce:GAGG is used for the fluorescent film 11a, the fluorescence persistence time of Ce:GAGG or the attenuation time t is about 100 $\eta_s$, and thus it is recommended that the exposure time of the image sensor 15 is 1000 $\eta_s$ or more, which is 10 times, that is, the maximum frame rate is 1 MHz or less.

An example will be shown in which the present embodiment is applied at a radiation light facility called SPring-8 owned by the applicant. For example, when quasi-monochromatic X rays having photon energy of 10 keV are used as the radiation source 200, the X rays R are incident on the detection surface (scintillator surface) at an intensity of $[I_{PH}=1\times10^{14}$ photons/sec/mm$^2]$ at the maximum. In the configuration in which GAGG is used for the solid immersion lens optical system and the solid immersion lens material, the numerical aperture is set to NA=1.76, and the spatial resolution is set to δ=180 nm. The effective pixel size A on the detection surface is about ½ to ⅓ of the spatial resolution δ, and is 60 nm here. In addition, the thickness of Ce:GAGG from which the focused fluorescence F1 is obtained is 311 nm, and the probability (X-ray quantum efficiency) $\eta_{XQE}$ that the X rays R is absorbed by the scintillator is $\eta_{XQE}=3.2\%$ when the X-ray energy is 10 keV. When the image sensor 15 performs the exposure operation at a frame rate of 1 MHZ, the detection density $I_{DET}$ of the X-ray photons of the subframe is $[I_{DET}=I_{PH}\times\eta_{XQE}\times T=1\times 10^{14}$ (photons/second/mm$^2$)×3.2(%)×1000 ($\eta_s$)=3.2×10$^6$ (photons/mm$^2$)=1.15×10$^{-2}$ (photons/pixel)]. That is, it is possible to obtain a value close to one X-ray photon for 100 pixels (=0.01 photons/pixel), which is an index of discretization of a visible point image.

As described above, when the light source intensity is determined, the minimum value of the frame rate is determined which satisfies the condition of at most one X-ray photon for 100 pixels ($I_{DET}$≤~0.01 photons/pixel) which is an index of discretization of the visible point image. For example, in the above embodiment, when the X rays R is incident on the detection surface at an intensity of 1×10$^{10}$ (photons/second/mm$^2$), the frame rate of the image sensor 15 is suitably ~100 Hz or more.

1010 of FIG. 4 shows a subframe group acquired by irradiating the sample 900 with the X rays R and performing continuous imaging at predetermined time intervals. By shortening the exposure time and making the subframes sufficiently fragmented in time, the X-ray signal in the image can be discretely observed in units of X-ray photons. Note that in 1010 of FIG. 4, the image generated by using only the focused signal shown in FIG. 3A is used. 1020 of FIG. 4 shows image data (indicated by an unclear "R" as an example in the drawing) obtained by integrating the subframe group shown in 1010 of FIG. 4.

As shown in 1010 of FIG. 4, even when only the focused signals are selected, the focused signals are signals having a range of a predetermined size in FIG. 3A, that is, the Airy disk f or a spot shape close thereto, and thus are slightly blurred, and when these focused signals are integrated, slightly blurred image data as shown in 1020 of FIG. 4 is obtained. Note that one point (circle) in the frame in 1010 of FIG. 4 indicates the imaging of the fluorescence F generated corresponding to one photon of the X rays absorbed by the fluorescent film 11a in the X rays R emitted from the radiation source 200.

1030 of FIG. 4 shows a subframe after the localization processing is performed on the subframe group shown in 1010 of FIG. 4. Specifically, the center position of the fluorescence F generated corresponding to one photon of the X rays in 1010 of FIG. 4 is calculated by image processing, and the fluorescence is expressed by one point (point image center) of the center position thereof. That is, the signal of the focused fluorescence spot detected across a plurality of pixels shows a distribution close to the Gaussian distribution in the Airy disk f, and thus the center position coordinates (x, y) of the spot can be confirmed by performing comparison processing on the signal level for each pixel. As shown in 1030 of FIG. 4, the subframe image after the localization processing is shown as one point of the point image center per X-ray photon, and thus the data has a highly accurate X-ray incident position. Therefore, as shown in 1040 of FIG. 4, a clear image (shown as a clear "R" as an example in the drawing) is obtained by integrating the subframe group in 1030 of FIG. 4.

As described above, by selecting only the focused signal (see FIG. 3A) and further performing imaging using the photon localization method (see FIG. 4), the spatial resolution of the radiation imaging apparatus 100 can be improved to a value exceeding the diffraction limit. In the present embodiment, since the spatial resolution of the radiation camera 10 using Ce:GAGG for the material of the fluorescent film 11a of the SIL 11 is δ=180 nm, the average value of the number of photons N of the fluorescence F matches the total X-ray/signal conversion efficiency $\eta_{TOTAL}$, and $\eta_{TOTAL}$ is 335 electrons/X-ray photons, when the photon localization method is applied, the super-resolution spatial resolution $[\delta_{SUPER}=\delta/\sqrt{\eta_{TOTAL}}=180$ nm/$\sqrt{335}$=9.8 nm (=resolution of 4.9 nm line&space)] is reached. Therefore, the spatial resolution can be significantly improved as compared with 96 nm (resolution at 48 nm line&space) which is the theoretical limit value of the conventional technique.

The position of the fluorescence F imaged on the image sensor 15 may fluctuate as the sample 900 moves due to the excessively high intensity of the X rays R or as an instrument for fixing and position-adjusting the sample 900 or the radiation camera 10 oscillates. In the present embodiment, drift correction for correcting the fluctuation in the position of the fluorescence F is performed. In the present embodiment, in the drift correction, the point image center x coordinate and the point image center y coordinate of each fluorescence F at the time t are obtained, and predetermined values Δx and Δy are corrected. Note that whether or not to perform the drift correction is arbitrary, and the drift correction may not be performed.

Figure 6:
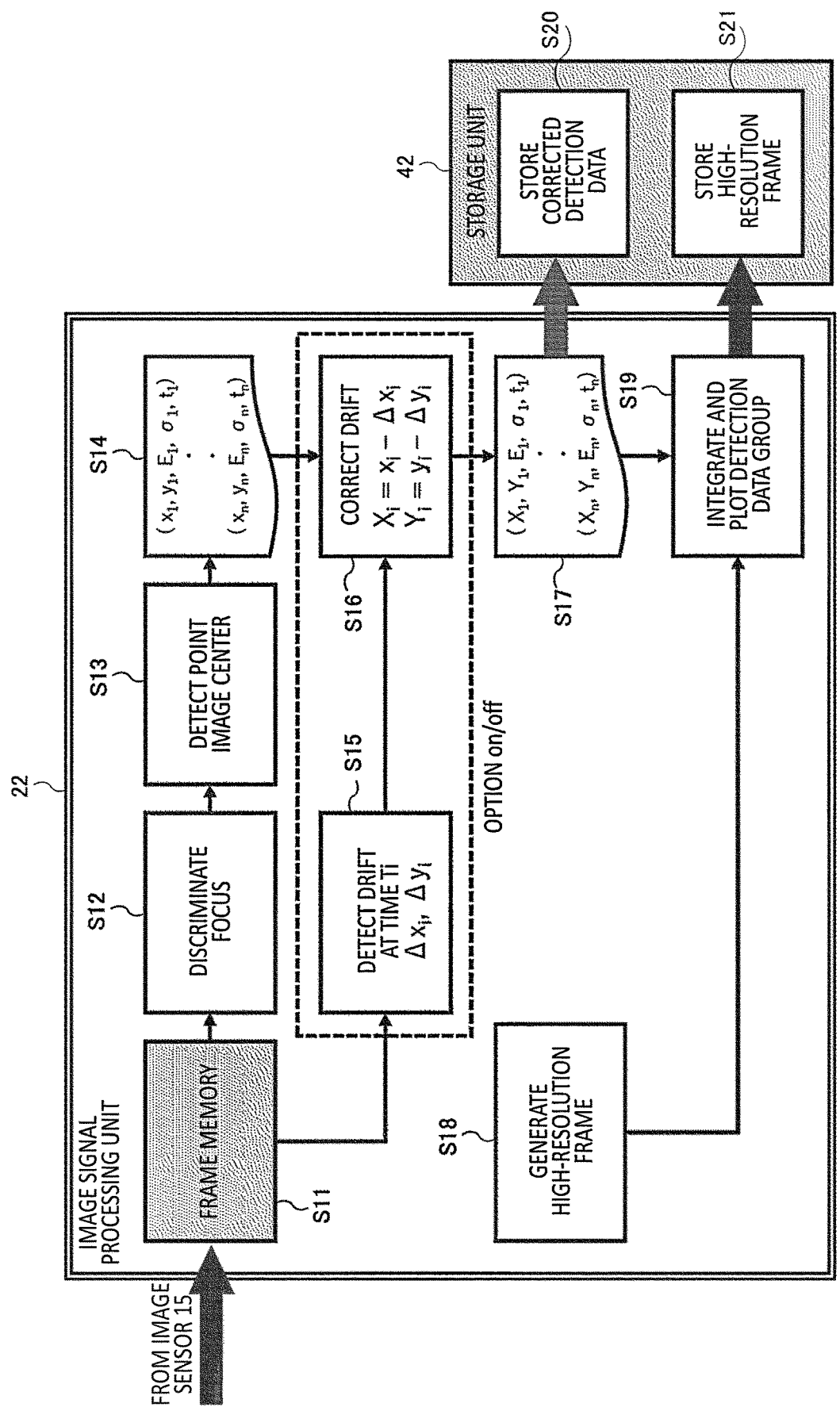
FIG. 6 is a diagram illustrating a flow of processing of an image signal in the present embodiment.

FIG. 6 is a diagram illustrating a flow of processing of the image signal in the present embodiment together with a system configuration. When the data of the subframe group read from the image sensor 15 of the radiation camera 10 is input to the image signal processing unit 22, the data is temporarily stored in a frame memory corresponding to the image data storage unit 22b (S11). Subsequently, it is discriminated whether each of all point image signals in the subframe group is a focused signal or an out-of-focus signal (S12). Subsequently, the center position of the point image regarded as the focused signal in the subframe group is detected (S13), detection data is generated for each point image, and a detection data group is obtained (S14). The detection data is configured by a point image center position (x, y), the number of photons N(E) of the fluorescence F forming a point image, the standard deviation (o) of the point image signal distribution, and the time (t) when the point image is detected. Note that, when all the pixel signals of the image sensor 15 are measured at the same timing, the time t may be a number specifying the subframe.

A spatial drift amount at the time t when each point image is detected is detected (S15), drift correction of the point image center position is performed based on the detected drift amount (S16), and a corrected detection data group shown in S17 is obtained. The corrected detection data group obtained in S17 is stored in the storage unit 42 (S20). On the other hand, an output frame of the reconstructed image is generated (S18), and the detection data group obtained in S17 is integrated and plotted on the output frame, thereby obtaining a high-resolution frame obtained by integrating subframe group that has been substantially subjected to photon localization processing (S19). The high-resolution frame is stored in the storage unit 42 (S21).

In FIG. 6, $x_i$ represents the x coordinate of the point image center position of an X-ray photon i, $y_i$ represents the y coordinate of the point image center position of the X-ray photon i, $\Delta x_i$ represents the amount of drift of the X-ray photon i in an x direction, $\Delta y_i$ represents the amount of drift of the X-ray photon i in a y direction, $X_i$ represents the x coordinate of the point image center position of the X-ray photon i after drift correction, $Y_i$ represents the y coordinate of the point image center position of the X-ray photon i after drift correction, $E_i$ represents the signal value (the value corresponding to the number of photons N of the fluorescence F detected by the image sensor 15) of the X-ray photon i, and, $\sigma_i$ represents the standard deviation (the standard deviation of the irradiation distribution of the fluorescence F detected by the image sensor 15) of the point image signal distribution of the X-ray photon i, and ti represents the detected time (or the number specifying the subframe). Subscript "n" in S14 and S17 indicates that n focused signals are detected from the subframe group.

In step of S19, when the detection data obtained in S17 is plotted, detection data with low quality may be excluded. The data with low quality means, for example, a case where the value of the standard deviation o is large and a case where the value of the signal value is small. A threshold thereof is set to a predetermined value in consideration of the numerical aperture and magnification of the optical system, the target spatial resolution, the theoretical visible point image (Airy disk f) shape according to the wavelength of the fluorescence F of the scintillator, and the total X-ray/signal conversion efficiency $\eta_{TOTAL}$.

Figure 7:
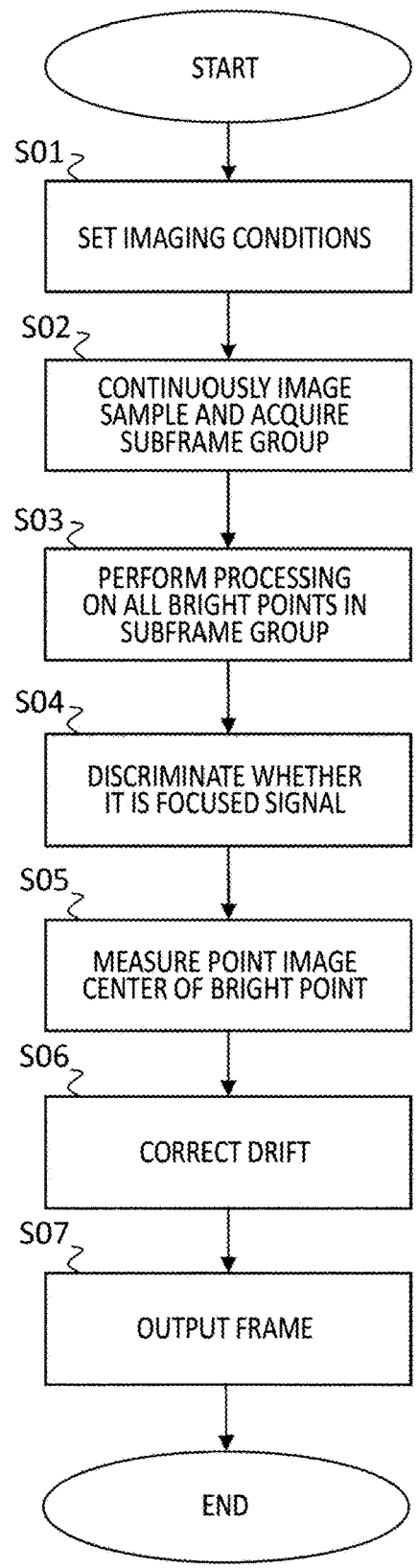
FIG. 7 is a flowchart illustrating an imaging operation of the radiation imaging apparatus 100 in the present embodiment.

FIG. 7 is a flowchart illustrating an imaging operation of the radiation imaging apparatus 100 according to the present embodiment. When the imaging operation of the radiation imaging apparatus 100 is started, in step S01, the control unit 20 sets photon energy, an output value, an energy spectrum, or the like of the X rays R of the radiation source 200 used for measurement. Next, the focus adjustment of the imaging optical system 17 is performed on the vicinity of the surface of the fluorescent film 11a on which the X rays R is incident, so as to form an image on the image sensor 15. In addition, imaging conditions such as the exposure time and the intensity of the X rays R suitable for spatially distinguishing the X rays for each photon are set. Specifically, the imaging conditions are set such that the exposure time of the image sensor 15 is shortened by the exposure time control unit 21a or the intensity of the X rays R is reduced, so as to lower the signal density of the X rays R per subframe, and the X rays R can be spatially distinguished for each photon as shown in FIG. 5C.

Here, when the high-energy X rays R having a strong transmission force is used, when the leading optical system is constituted by using the SIL 11 formed of a fluorescent material as a whole as shown in FIG. 2C, or when both are adopted to constitute the radiation camera 10, there is a case where the ratio of the detected out-of-focus signals becomes extremely high. In this case, even when the signal density of the X rays R per frame is lowered, if the diameter of the blur spot created by the out-of-focus signal is large, background noise becomes large due to overlapping of the signals of a plurality of out-of-focus signals, and the point image of the focused signal is buried in the noise and cannot be distinguished in some cases. The cases may be handled by further shortening the exposure time or reducing the intensity of the X rays R to set a condition that only one X-ray photon is detected per subframe, and separating the focused signal and the out-of-focus signal into different subframes.

Subsequently, under the imaging conditions constructed in step of S01, an output frame of the reconstructed image according to the estimated spatial resolution $\delta_{SUPER}$ and a visual field range is generated.

Subsequently, in step S02, the camera control unit 21 continuously images the sample 900 under the set imaging conditions, and acquires a subframe group of the sample 900.

Subsequently, in step S03, the image signal processing unit 22 performs processing on all bright points in the subframe group obtained in step S02, and acquires a profile of each bright point. Subsequently, in step S04, the profile of each bright point is evaluated to discriminate whether the signal is a focused signal or an out-of-focus signal. Here, as shown in FIG. 3A, the focused signal is detected as a signal which falls within a predetermined range on the image sensor 15, that is, the Airy disk f or a spot shape close thereto, and on the other hand, as shown in FIG. 3B, the out-of-focus signal is detected as a signal which exceeds the predetermined range on the image sensor 15, that is, a spot shape larger than the Airy disk f, and thus, it is possible to discriminate whether the signal is the focused signal or the out-of-focus signal by detecting and evaluating the distribution of the signals.

Subsequently, in step S05, the image signal processing unit 22 detects, by image processing, the point image center of the bright point classified as the focused signal in step S04. In step S06, the image signal processing unit 22 corrects the drift of the point image center position, based on the detected drift amount. In step S07, the image signal processing unit 22 plots each detected point image center in the output frame to construct a high-resolution frame in which the entire image is reconstructed.

As described above, according to the radiation imaging apparatus 100 of the present embodiment, an image is configured by using only a focused signal, and data processing using the photon localization method is further performed, so that the contrast quality of the image can be improved, and the spatial resolution of the radiation imaging apparatus 100 can be improved to $\delta_{SUPER}$=9.8 nm (=4.9 nm line&space is resolved).

The number of required subframe groups is determined by the detection density $I_{DET}$, the ratio of the effective pixel size A on the detection surface to the pixel size $A_{SUPER}$ of the high-resolution frame to be finally output, and the dynamic range D (the maximum value of the number of X-ray photons in one pixel) of the high-resolution frame to be finally output, and is expressed by $N_{FRAME}$=D/($I_{DET}$×($A_{SUPER}$/A)$^2$).

When super-resolution processing such as photon localization is performed, the detection density value serving as an index is $I_{DET}$=0.01 photons/pixel, the spatial resolution is often improved to about 10 times of the original image, and the maximum gradation that can be confirmed by human eyes is about 8 bits (=256), so that acquisition of subframe groups of $N_{FRAME}$=256/(0.01×(1/10)$^2$)=2.56×10$^6$ is an index. Actually, even when $N_{FRAME}$ is a value smaller than the value, for example, about 6.4×10$^5$ with D=6 bits, the photon localization processing can be applied to obtain a high-resolution image with improved spatial resolution.

When $I_{DET}$=0.01 photons/pixel, A=60 nm, the pixel size $A_{SUPER}$ of about ⅓ of the spatial resolution $\delta_{SUPER}$, $A_{SUPER}$=$\delta_{SUPER}$/3=9.8 nm/3=3.3 nm, and the dynamics range D=8 bits=2$^8$ photons=256 photons are set using the parameters of the present embodiment, the number of required subframes can be estimated as $N_{FRAME}$=256/(0.01×(3.3/60)$^2$)=8.5×10$^6$. In the case of a configuration in which a subframe can be acquired at a speed of 1 MHz, the total imaging time is $T_{TOTAL}$=8.5×10$^{6/1}$ MHz=8.5 seconds.

(Generation of Energy-Resolved Image)

Figure 8:
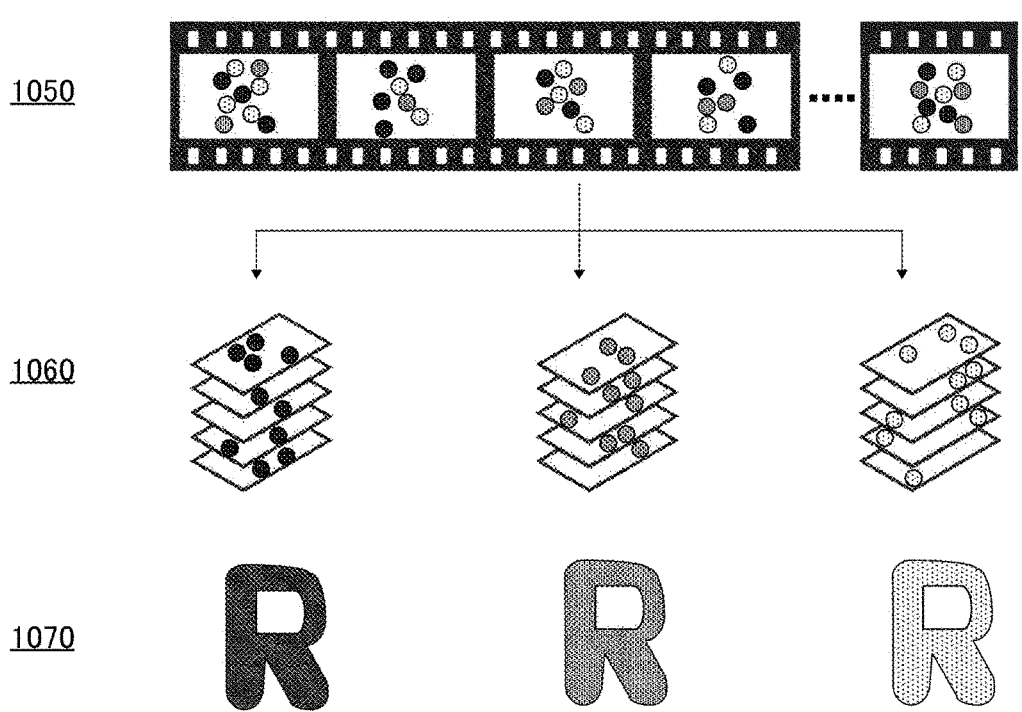
FIG. 8 is a diagram for explaining the image processing in another embodiment.

The above is an example in a case where the energy of all the X-ray photons is monochromatic or quasi-monochromatic as in the radiation light facility. On the other hand, 1050 to 1070 of FIG. 8 are diagrams for explaining image processing by the X-ray energy resolved image generation unit 22d (FIG. 1) when the X-ray light source in which energy is mixed is used. The focused fluorescence F1 acquired by the continuous imaging in step S02 in FIG. 7 and discriminated and extracted in step S04 in the above embodiment has different energy of incident X-ray photons, and thus is detected on the image sensor 15 as point images configured with different number of photons N (1050 of FIG. 8). Since the sum value (E of the detection data) of the pixels configuring the point image is proportional to the photon energy, the magnitude of the X-ray energy can be measured for each focused fluorescence F1. The detection error is a Poisson error depending on the number of photons N of the fluorescence F forming a point image, and is expressed by 1/√N.

For example, when the fluorescence F is detected with the number of photons N=335 on the image sensor 15, the detection error is 1/√335=5.4%. The X rays of 10 keV mean that the measurement can be performed with an energy resolution of 0.54 keV. As described above, as the number of photons N of the detected fluorescence F increases, the detection error decreases, so that the energy resolution is improved. That is, when the total X-ray/signal conversion efficiency $\eta_{TOTAL}$ of the radiation camera 10 is improved by using a solid immersion lens optical system or a scintillator with high conversion efficiency such as Ce:GAGG, the energy resolution is improved.

Subsequently, a plurality of ranges of X-ray energy are set, and the focused fluorescence F1 is classified into each range. 1060 of FIG. 8 shows, as an example, an aspect where three X-ray energy ranges are set, and subframes are divided into each energy range and integrated. In the actual data processing, an output frame is selected and plotted according to the magnitude of the number of photons N of the fluorescence F forming the point image for each detection data of the point image. Accordingly, an image can be generated for each energy range (1070 of FIG. 8). Note that in 1060 and 1070 and FIG. 8, dark hatching (left drawing) indicates the fluorescence F with a large number of photons N, hatching with an intermediate density (center drawing) indicates the fluorescence F with an intermediate number of photons N, and thin hatching (right drawing) indicates the fluorescence F with a small number of photons N.

As described above, in the present embodiment, each X-ray photon can be classified into a plurality of X-ray energy ranges, and an image can be generated for each X-ray energy range. That is, the present image processing serves as an energy filter. Accordingly, the energy dependence of the X-ray image can be observed with one-time imaging, so that the constituent material can be specified in addition to the internal structure of the sample 900. According to the present method, energy to be handled as data by the detector can be selected, and thus X-ray imaging using quasi-monochromatic energy can be performed even in an industrial X-ray generation apparatus in which energy is widely mixed.

In addition, it is also possible to apply the photon localization processing to the point image, which is energy-resolved, in each subframe for each energy range shown in 1060 of FIG. 8, and the radiation imaging apparatus 100 having the energy resolution and the high spatial resolution at the same time can be realized.

(Other Modifications)

In each data processing shown in FIGS. 6 and 7, high-speed and real-time data processing can be performed by using not only a CPU in a computer but also hardware operation by an integrated circuit such as a FPGA, a ASIC, or a GPU in an electronic circuit of the image data read control unit 21b which is a drive/data read unit of the image sensor 15. Alternatively, a configuration in which circuits equivalent to these functions are mounted on the image sensor 15 is also possible.

The present embodiment can be applied not only to a refractive type objective lens but also to a reflective type objective lens (Schwarzschild type). In this case, it is possible to design an objective lens having a high numerical aperture in a short wavelength region UV, and the spatial resolution is further improved. For example, Pr:LuAG which generates the fluorescence F that is ultraviolet light having a wavelength of 305 nm can be adopted for the fluorescent film 11a.

The imaging optical system 17 may further include a cylindrical lens. By using a cylindrical lens having an appropriate focal length according to the focal depth of the objective rear-stage lens group 12, as shown in FIGS. 3A and 3B, not only the size of the point image profile but also the shape such as the aspect ratio of the profile is evaluated, so that the accuracy of discrimination between the focused signal and the out-of-focus signal can be improved, and the high-definition sample 900 can be observed.

While the present invention has been described by way of the embodiments, the technical scope of the present invention is not limited to the above described embodiments. It is apparent to persons skilled in the art that various alterations or improvements can be made to the above described embodiments. It is also apparent from the description of the claims that embodiments added with such alterations or improvements can be included in the technical scope of the present invention.

The operations, procedures, steps, and stages of each process performed by an apparatus, system, program, and method illustrated in the claims, embodiments, or diagrams can be performed in any order as long as the order is not indicated by "prior to," "before," or the like and as long as the outputted from a previous process is not used in a later process. Even if the operation flow is described by using phrases such as "first" or "next" in the scope of the claims, specification, or drawings, it does not necessarily mean that the process must be performed in this order.

EXPLANATION OF REFERENCES

10: radiation camera; 11: SIL; 11a: fluorescent film; 11b: lens-shaped substrate; 11e: lens-shaped fluorescent substrate; 11f: SIL stage; 12: objective rear-stage lens group; 13: band pass filter; 14: imaging lens; 15: image sensor; 16: objective lens; 17: imaging optical system; 20: control unit; 21: camera control unit; 21a: exposure time control unit; 21b: image data read control unit; 22: image signal processing unit; 22a: focused signal discrimination unit; 22b: image data storage unit; 22c: point image signal detection unit; 22d: X-ray energy resolved image generation unit; 100: radiation imaging apparatus; 200: radiation source; 300: stage control unit; 400: radiation attenuation plate; 500: radiation source control unit; 900: sample; 910: sample stage; R: X ray, F: fluorescence; F1: focused fluorescence; F2: out-of-focus fluorescence; and f: Airy disk.

What is claimed is:

1. A radiation imaging apparatus comprising:
a radiation camera including
a scintillator on which radiation transmitted through an imaging target from a radiation source is incident and which emits fluorescence having a longer wavelength than that of the radiation,
an imaging optical system which forms an image on an imaging plane through an objective lens of which depth of field is adjusted to a specimen surface set in the scintillator, and
an image sensor which has a light receiving surface arranged on the imaging plane and including a plurality of pixels; and
a control unit which generates an image based on a sensor signal for each of the plurality of pixels output from the image sensor of the radiation camera, wherein
the control unit has an exposure time control unit which controls a subframe exposure time of the image sensor such that focused fluorescence at a depth of field generated by radiation reaching the scintillator and out-of-focus fluorescence deviating from the depth of field are discretely imaged on a light receiving surface of the image sensor for each particle of the radiation, a focused signal discrimination unit which discriminates between point image sensor signals of a light receiving pixel group corresponding to spots of the focused fluorescence discretely included in each subframe and point image sensor signals of a light receiving pixel group corresponding to spots of the out-of-focus fluorescence, and an image signal processing unit which generates the image by integrating subframe data based on the point image sensor signals from the light receiving pixel group corresponding to the spots of the focused fluorescence.

2. The radiation imaging apparatus according to claim 1, wherein the image signal processing unit includes a point image signal detection unit which processes the point image sensor signals from the light receiving pixel group corresponding to the spots of the focused fluorescence, calculates a center position of a point image in the light receiving pixel group, and generates the image based on the center position.

3. The radiation imaging apparatus according to claim 1, wherein the image signal processing unit includes a radiation energy resolved image generation unit which sorts light reception sensor signal levels for each of the spots of the focused fluorescence generated corresponding to the radiation discretely incident on the scintillator with different energies in units of particles, into a plurality of level ranges in a plurality of consecutive subframes, and generates the image corresponding to energy distribution of the radiation, based on sensor signals of the spots of the focused fluorescence included in a same level range.

4. The radiation imaging apparatus according to claim 1, wherein the exposure time control unit controls exposure time according to an intensity of the radiation so that a radiation detection frequency in the image sensor is 0.02 photons/pixel/subframe or less, and obtains at least $6.4 \times 10^5$ consecutive imaging signals including a plurality of subframes to generate the image.

5. The radiation imaging apparatus according to claim 1, wherein the objective lens includes a first front lens having a solid immersion lens configuration in which a fluorescent film as the scintillator is integrally formed on an incident surface side of the radiation.

6. The radiation imaging apparatus according to claim 1, wherein the objective lens includes a first front lens including a fluorescent film as the scintillator and a lens-shaped substrate in which the fluorescent film is integrally formed on an incident surface side of the radiation, and the fluorescent film includes a solid optical material obtained by using, as a base material, a solid optical material composing the lens-shaped substrate and adding a predetermined activator.

7. The radiation imaging apparatus according to claim 6, wherein the lens-shaped substrate is formed of an additive-free garnet crystal, and the fluorescent film is formed of a garnet crystal obtained by adding an activator to the additive-free garnet crystal.

8. The radiation imaging apparatus according to claim 6, wherein the lens-shaped substrate is formed of additive-free gadolinium aluminum gallium garnet (GAGG), and the fluorescent film is formed of gadolinium aluminum gallium garnet (Ce:GAGG) obtained by adding cerium as an activator.

9. The radiation imaging apparatus according to claim 1, wherein the objective lens includes a first front lens including a fluorescent film as the scintillator and a lens-shaped substrate in which the fluorescent film is integrally formed on an incident surface side, and a difference in refractive index between the fluorescent film and the lens-shaped substrate is less than 0.1%.

10. The radiation imaging apparatus according to claim 1, wherein the objective lens includes a first front lens having a solid immersion lens configuration formed of a material having a scintillator function.

11. The radiation imaging apparatus according to claim 1, wherein the radiation imaging apparatus has a total radiation/signal conversion efficiency at which fluorescence generated on a fluorescent film by one photon or one particle of radiation is detected as a point image signal of 50 electrons or more in pixels on an image sensor light receiving surface.

12. The radiation imaging apparatus according to claim 1, wherein the radiation is an X ray, and a total X-ray/signal conversion efficiency $\eta_{TOTAL}$ indicating conversion efficiency into a sensor signal detected by the image sensor satisfies a conditional expression of $[\eta_{TOTAL}=\eta_{LY}(E)\times\eta_{CE}(NA)\times\eta_{TO}\times\eta_{VQE}>50]$ using a light emission efficiency $\eta_{LY}(E)$ of an optical system, a light collection efficiency $\eta_{CE}(NA)$ of the optical system depending on a numerical aperture NA, a transmittance $\eta_{TO}$ of the optical system, and a quantum efficiency $\eta_{VQE}$ for fluorescence of the image sensor.

13. A radiation imaging method which uses a radiation imaging apparatus which mainly includes a camera unit, which includes a solid immersion type first front lens including a scintillator which converts incident radiation into visible light on an incident surface side of radiation and having a lens shape on an emission surface side and observes a visible light image from the solid immersion type first front lens by an image sensor having a light receiving surface including a plurality of pixels, controls an exposure time for each subframe of the image sensor to collect radiation incident on the scintillator as a point image signal of a visible light spot which is discrete for each particle, then discriminates the point image signal in each subframe between the point image signal of a focused light spot emitted at a depth of field of the solid immersion type first front lens and the point image signal of an out-of-focus light spot emitted outside the depth of field, and generates a radiation observation image by overlaying subframe data based on the point image signal of the focused light spot.

14. A radiation imaging method,
in a radiation imaging apparatus including a radiation camera including
a scintillator on which radiation transmitted through an imaging target from a radiation source is incident and which emits fluorescence having a longer wavelength than that of the radiation,
an imaging optical system which forms an image on an imaging plane through an objective lens of which depth of field is adjusted to a specimen surface set in the scintillator, and
an image sensor which has a light receiving surface arranged on the imaging plane and including a plurality of pixels, comprising
performing control by generating an image based on a sensor signal for each of the plurality of pixels output from the image sensor, wherein
the performing control includes controlling an exposure time by controlling a subframe exposure time of the image sensor such that focused fluorescence at a depth of field generated by radiation reaching the scintillator and out-of-focus fluorescence deviating from the depth of field are discretely imaged on a light receiving surface of the image sensor for each particle of the radiation, discriminating a focused signal by discriminating between sensor signals of a light receiving pixel group corresponding to spots of the focused fluorescence discretely included in each subframe and sensor signals of a light receiving pixel group corresponding to spots of the out-of-focus fluorescence, and processing an image signal by generating the image by overlaying subframe data based on the sensor signals from the light receiving pixel group corresponding to the spots of the focused fluorescence.

15. The radiation imaging method according to claim 14, wherein
the radiation is an X ray, and the radiation camera is an X-ray camera including the objective lens and the scintillator optically designed such that conversion efficiency per X-ray photon from the X ray to a sensor signal detected by the image sensor is 50 or more in terms of number of electrons, and
the method further includes performing signal processing of detecting a point image center position of the spot of the focused fluorescence, and generating a super-resolution X-ray image by overlaying subframe data including point image center data of the detected point image center position.

* * * * *